United States Patent
Tsuruoka

(10) Patent No.: US 8,019,174 B2
(45) Date of Patent: Sep. 13, 2011

(54) IMAGE PROCESSING SYSTEM, IMAGE PROCESSING METHOD, AND IMAGE PROCESSING PROGRAM PRODUCT

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 826 days.

(21) Appl. No.: 12/100,128

(22) Filed: Apr. 9, 2008

(65) Prior Publication Data

US 2008/0193019 A1 Aug. 14, 2008

Related U.S. Application Data

(63) Continuation of application No. PCT/JP2006/318966, filed on Sep. 25, 2006.

(30) Foreign Application Priority Data

Oct. 12, 2005 (JP) .................................. 2005-297983

(51) Int. Cl.
*G06K 9/40* (2006.01)
*G06K 9/00* (2006.01)

(52) U.S. Cl. ........................................ 382/275; 382/162

(58) Field of Classification Search .......... 382/274–275, 382/254, 260–270, 162–167; 348/241, 222.1, 348/270, 273, 606–616; 358/1.9, 3.26, 3.04
See application file for complete search history.

(56) References Cited

U.S. PATENT DOCUMENTS

| | | | | |
|---|---|---|---|---|
| 6,097,836 A * | 8/2000 | Inoue | ............................. | 382/165 |
| 6,346,994 B1 * | 2/2002 | Inoue | ............................. | 358/1.9 |
| 7,031,548 B2 * | 4/2006 | Baggs | ............................. | 382/261 |
| 7,324,701 B2 * | 1/2008 | Nakami | ............................. | 382/262 |
| 7,570,287 B2 * | 8/2009 | Tsuruoka | ............................. | 348/241 |
| 7,595,825 B2 * | 9/2009 | Tsuruoka | ............................. | 348/241 |
| 7,656,442 B2 * | 2/2010 | Tsuruoka | ............................. | 348/241 |
| 2006/0066736 A1 | 3/2006 | Tsuruoka | | |
| 2008/0152222 A1 * | 6/2008 | Takeuchi | ............................. | 382/167 |

FOREIGN PATENT DOCUMENTS

| | | |
|---|---|---|
| JP | 06-205216 | 7/1994 |
| JP | 08-036640 | 2/1996 |
| JP | 2004-072422 | 3/2004 |
| JP | 2005-175718 | 6/2005 |
| JP | 2006-101006 | 4/2006 |
| WO | WO 2005/057938 | 6/2005 |
| WO | WO 2006/004151 | 1/2006 |

OTHER PUBLICATIONS

International Search Report dated Dec. 26, 2006 issued in corresponding PCT Application No. PCT/JP2006/318966.

* cited by examiner

*Primary Examiner* — Sherali Ishrat
(74) *Attorney, Agent, or Firm* — Ostrolenk Faber LLP

(57) ABSTRACT

An image processing system includes an extraction unit for extracting a local region which contains one target region and at least one or more neighborhood regions from an image signal formed of a plurality of color signals from a CCD, a vectorizing unit for obtaining vector signals which contain the plurality of the color signals as components for each of the target and the neighborhood regions, a weighting set unit for setting weighting factors with respect to each of the vector signals in the local region based on the vector signal in the target region, a filtering unit for performing a filtering process using the weighting factors with respect to the vector signals in the local region, and a noise reducing unit for reducing the noise of the vector signal in the target region based on the vector signal through the filtering process.

32 Claims, 17 Drawing Sheets

FIG.2A

NEIGHBORHOOD REGION

TARGET REGION

FIG.2B

VECTOR SIGNAL IN TARGET REGION
$V_0=\{v_{01}, v_{02}, v_{03}, v_{04}\}=\{R_4, Gr_4, Gb_4, B_4\}$

FIG.3A

NEIGHBORHOOD REGION

TARGET REGION

FIG.3B

VECTOR SIGNAL IN TARGET REGION
$V_0=\{v_{01}, v_{02}, v_{03}, v_{04}\}=\{R_{12}, Gr_{12}, Gb_{12}, B_{12}\}$

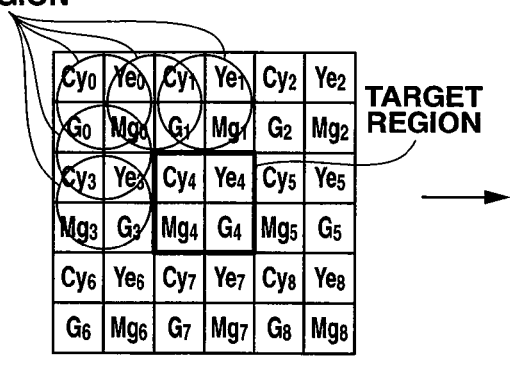
FIG.4A FIG.4B
VECTOR SIGNAL IN TARGET REGION
$V_0=\{v_{01}, v_{02}, v_{03}, v_{04}\}=\{Cy_4, Mg_4, Ye_4, G_4\}$

FIG.17A

NEIGHBORHOOD REGION

| R₀ | R₁ | R₂ | R₃ | R₄ |
|---|---|---|---|---|
| R₅ | R₆ | R₇ | R₈ | R₉ |
| R₁₀ | R₁₁ | R₁₂ | R₁₃ | R₁₄ |
| R₁₅ | R₁₆ | R₁₇ | R₁₈ | R₁₉ |
| R₂₀ | R₂₁ | R₂₂ | R₂₃ | R₂₄ |

TARGET REGION

FIG.17B

NEIGHBORHOOD REGION

| G₀ | G₁ | G₂ | G₃ | G₄ |
|---|---|---|---|---|
| G₅ | G₆ | G₇ | G₈ | G₉ |
| G₁₀ | G₁₁ | G₁₂ | G₁₃ | G₁₄ |
| G₁₅ | G₁₆ | G₁₇ | G₁₈ | G₁₉ |
| G₂₀ | G₂₁ | G₂₂ | G₂₃ | G₂₄ |

TARGET REGION

FIG.17C

NEIGHBORHOOD REGION

| B₀ | B₁ | B₂ | B₃ | B₄ |
|---|---|---|---|---|
| B₅ | B₆ | B₇ | B₈ | B₉ |
| B₁₀ | B₁₁ | B₁₂ | B₁₃ | B₁₄ |
| B₁₅ | B₁₆ | B₁₇ | B₁₈ | B₁₉ |
| B₂₀ | B₂₁ | B₂₂ | B₂₃ | B₂₄ |

TARGET REGION

FIG.17D

| $V_1$ | $V_2$ | $V_3$ | $V_4$ | $V_5$ |
|---|---|---|---|---|
| $V_6$ | $V_7$ | $V_8$ | $V_9$ | $V_{10}$ |
| $V_{11}$ | $V_{12}$ | $V_0$ | $V_{13}$ | $V_{14}$ |
| $V_{15}$ | $V_{16}$ | $V_{17}$ | $V_{18}$ | $V_{19}$ |
| $V_{20}$ | $V_{21}$ | $V_{22}$ | $V_{23}$ | $V_{24}$ |

VECTOR SIGNAL IN TARGET REGION
$V_0 = \{v_{01}, v_{02}, v_{03}\} = \{R_{12}, G_{12}, B_{12}\}$

IMAGE PROCESSING SYSTEM, IMAGE PROCESSING METHOD, AND IMAGE PROCESSING PROGRAM PRODUCT

CROSS REFERENCE TO RELATED APPLICATION

This application is a continuation application of PCT/JP2006/318966 filed on Sep. 25, 2006 and claims benefit of Japanese Application No. 2005-297983 filed on Oct. 12, 2005, the entire contents of which are incorporated herein by this reference.

BACKGROUND OF THE INVENTION

1. Field of the Invention

The present invention relates to an image processing system, image processing method, and an image processing program product capable of reducing the noise caused by the image pickup system.

2. Description of the Related Art

In general, a digital image pickup unit, for example, digital camera, digital video camera and the like includes an image pickup device, an analog circuit for subjecting the analog signal outputted from the image pickup device to various analog processings, and an A/D converter for converting the signal from the analog circuit into a digital signal.

The digital signal derived from the A/D converter of the digital image pickup unit generally contains noise which may be mainly classified into two types, that is, random noise and spike noise.

The random noise is generated in the image pickup device and the analog circuit, and has the characteristics similar to white noise properties.

Meanwhile, the spike noise is mainly caused by the image pickup device, and is typified by defective pixels or the like.

Various proposals for reducing the noise have been introduced.

Japanese Unexamined Patent Application Publication No. 2004-72422 discloses that the generation amount of the random noise for each color signal is subjected to modeling to dynamically estimate the noise amount such that the noise reducing process is performed. The disclosed technology allows the highly accurate noise reducing process for each pixel under no influence of the shooting condition.

Japanese Unexamined Patent Application Publication No. 6-205216 discloses that the determination is made as to whether or not the spike noise, and upon detection of the spike noise, the median filtering process is performed while enlarging the size of the block to be processed. This makes it possible to allow the stable noise reducing process with respect to various types of the spike noise.

Japanese Unexamined Patent Application Publication No. 8-36640 discloses the technology with respect to general noise, more specifically, the technology for vectorizing RGB signal to correct the vector signal so as to minimize the evaluation function inside the vector space. This makes it possible to reduce the color noise while maintaining the edge regions.

According to the technology disclosed in Japanese Unexamined Patent Application Publication No. 2004-72422, the random noise may be sufficiently reduced, but the spike noise cannot be sufficiently reduced. The technology is intended to perform the noise reducing process for each color signal, which requires the processing a plurality of times corresponding to the number of the color signals. This may elongate the processing time.

According to the technology disclosed in Japanese Unexamined Patent Application Publication No. 6-205216, the median filtering process is performed while enlarging the block size sequentially. This may sufficiently reduce the spike noise. However, the limit to which the block size is allowed to be enlarged becomes different depending on the subject to be processed, resulting in the unstable and long processing time. Additionally, as the median filtering process is independently performed for each color signal, some pixel may have the hue sharply changed.

According to the technology disclosed in Japanese Unexamined Patent Application Publication No. 8-36640, the appropriate setting of the evaluation function allows the general noise to be reduced in good condition. However, it is difficult to automatically set the appropriate evaluation function. In the technology, the processing is required to be performed recurrently until the evaluation function converges, resulting in unstable and elongated processing time.

It is an object of the present invention to provide an image processing system, image processing method, and an image processing program product capable of automatically performing the highly accurate noise reducing process.

It is another object of the present invention to provide an image processing system, image processing method, and an image processing program product capable of performing the high speed noise reducing process without causing the adverse effect such as change in the hue.

SUMMARY OF THE INVENTION

The present invention provides an image processing system which performs a noise reducing process with respect to an image signal formed of a plurality of color signals from an image pickup device. The image processing system includes extraction means for extracting a local region which contains a target region to be subjected to the noise reducing process, and at least one neighborhood region in the neighborhood of the target region from the image signal, vectorizing means for obtaining a vector signal which contains the plurality of color signals as components for each of the target and the neighborhood regions, set means for setting a weighting factor with respect to each of the vector signals in the local region based on the vector signal in the target region, filtering means for performing a filtering process using the weighting factor with respect to the vector signal in the local region, and noise reducing means for reducing a noise of the vector signal in the target region based on the vector signal through the filtering process.

The present invention provides an image processing method which executes a noise reducing process with respect to an image signal formed of a plurality of color signals from an image pickup device. The image processing method includes an extraction step for extracting a local region including a target region to be subjected to a noise reduction process and at least one neighborhood region in the neighborhood of the target region from the image signal, a vectorizing step for obtaining a vector signal which contains the plurality of color signals as components for each of the target and the neighborhood regions, a set step for setting a weighting factor with respect to each of the vector signals in the local region based on the vector signal in the target region, a filtering step for filtering the vector signal in the local region using the weighting factor, and a noise reducing step for reducing a noise of the vector signal in the target region based on the vector signal through the filtering step.

The present invention provides an image processing system which performs a noise reducing process with respect to an image signal formed of a plurality of color signals from an image pickup device. The image processing system includes an extraction unit for extracting a local region which contains a target region to be subjected to the noise reducing process, and at least one neighborhood region in the neighborhood of the target region from the image signal, a vectorizing unit for obtaining a vector signal which contains the plurality of color signals as components for each of the target and the neighborhood regions, a set unit for setting a weighting factor with respect to each of the vector signals in the local region based on the vector signal in the target region, a filtering unit for performing a filtering process using the weighting factor with respect to the vector signal in the local region, and a noise reducing unit for reducing a noise of the vector signal in the target region based on the vector signal through the filtering process.

The present invention provides an image processing program product which allows a computer to execute a noise reducing process with respect to an image signal formed of a plurality of color signals from an image pickup device. The image processing program product includes a first module for extracting a local region including a target region to be subjected to a noise reduction process and at least one neighborhood region in the neighborhood of the target region from the image signal, a second module for obtaining a vector signal which contains the plurality of color signals as components for each of the target and the neighborhood regions, a third module for setting a weighting factor with respect to each of the vector signals in the local region based on the vector signal in the target region, a fourth module for filtering the vector signal in the local region using the weighting factor, and a fifth module for reducing a noise of the vector signal in the target region based on the vector signal through the filtering process.

BRIEF DESCRIPTION OF THE DRAWINGS

FIGS. 2A, 2B illustrate the structure of a local region as an example of Bayer-type 6×6 pixels, and vectorization of the signal in the local region in Embodiment 1.

FIGS. 3A, 3B illustrate the structure of the local region as an example of Bayer-type 10×10 pixels, and vectorization of the signal in the local region in Embodiment 1.

FIGS. 4A, 4B illustrate the structure of the local region as an example of the color-difference line-sequential type 6×6 pixels, and vectorization of the signal in the local region in Embodiment 1.

FIGS. 17A, 17B, 17C, 17D show the structure of the local region of three CCD with 5×5 pixels size, and vectorization of the signal in the local region according to Embodiment 2.

DETAILED DESCRIPTION OF THE PREFERRED EMBODIMENT(S)

Figure 1:
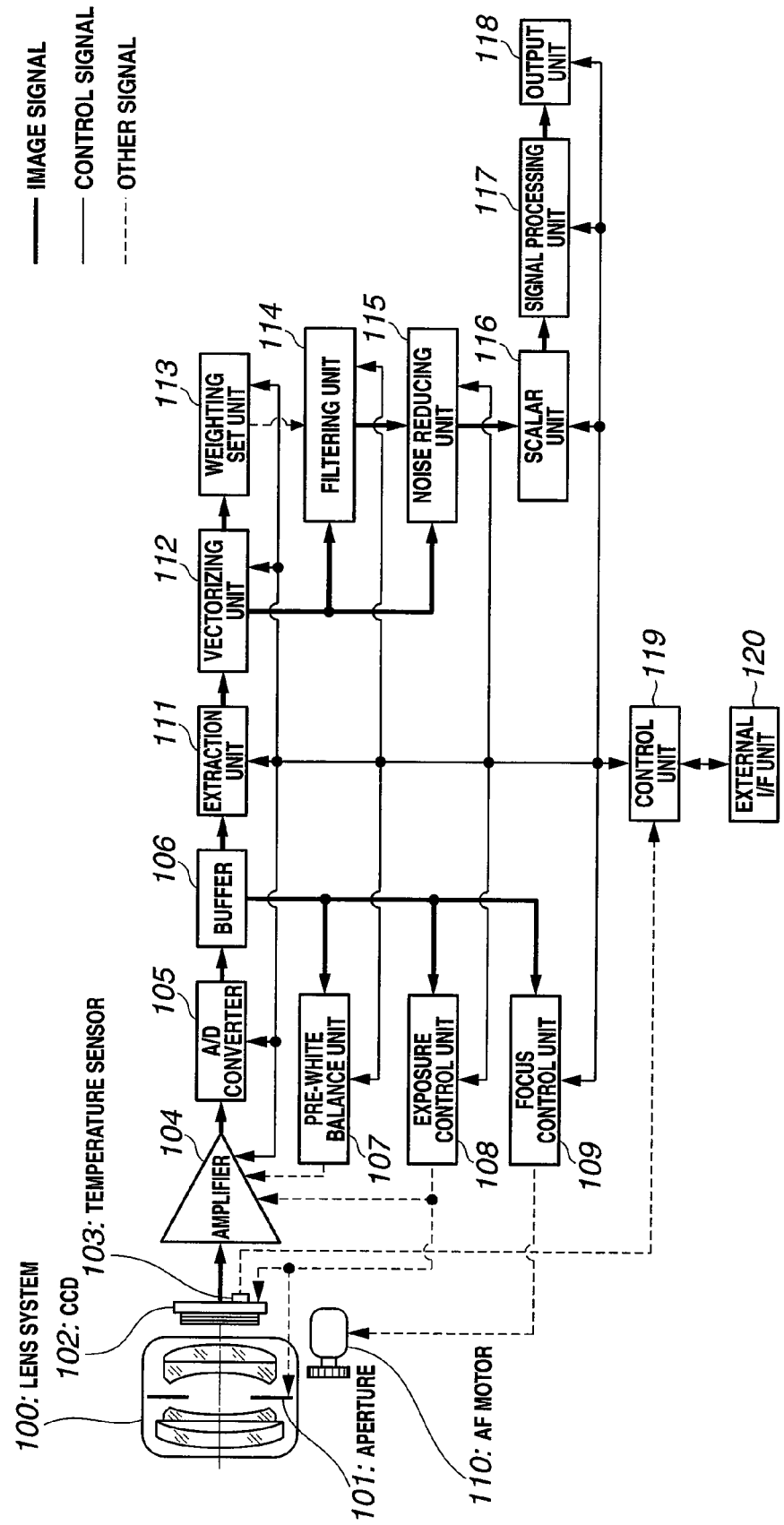
FIG. 1 is a block diagram of an image processing system according to Embodiment 1 of the present invention.

Embodiments of the present invention will be described referring to the drawings.

Embodiment 1

Figure 5:
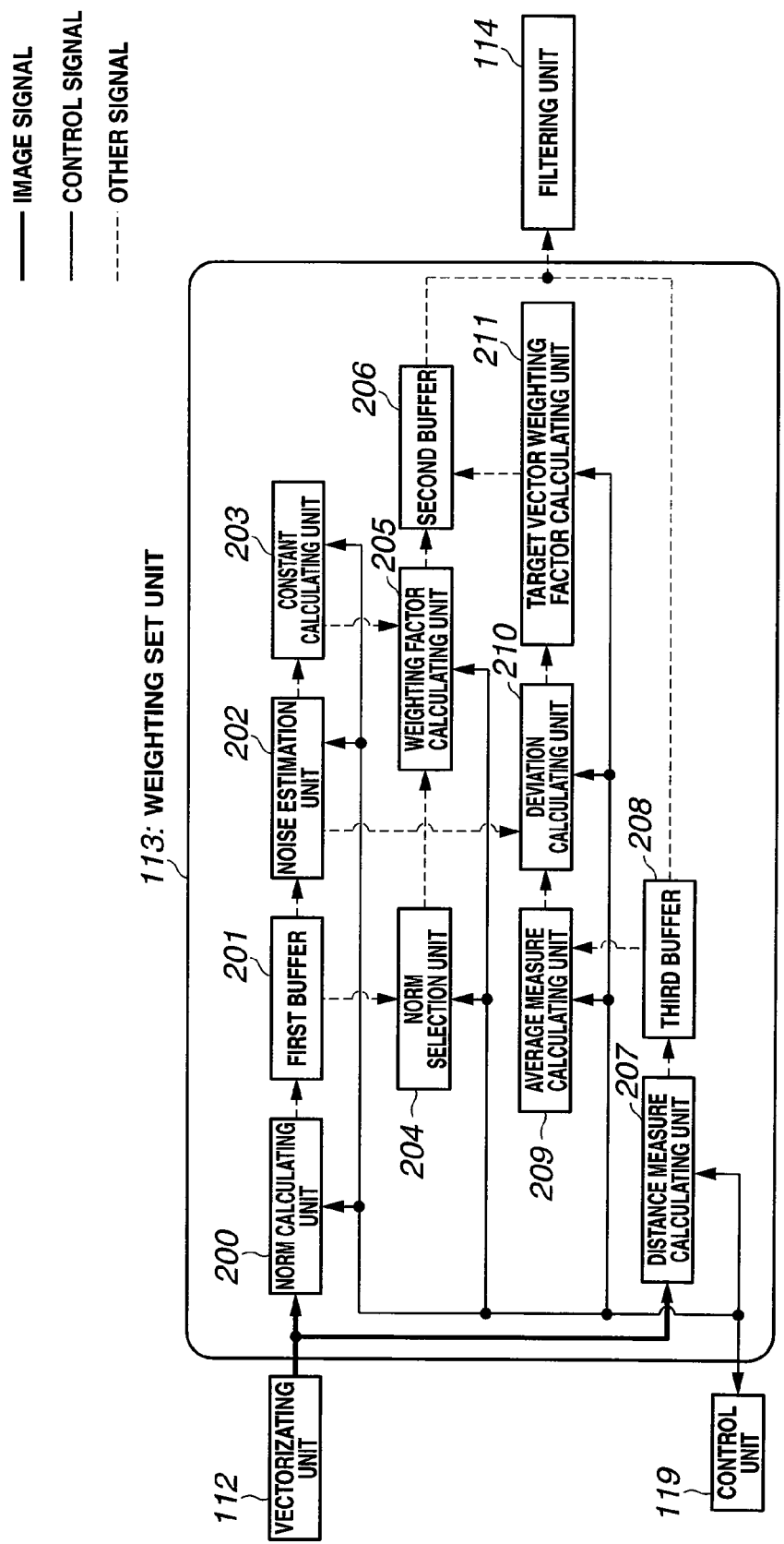
FIG. 5 is a block diagram showing the structure of the weighting set unit according to Embodiment 1.
Figure 6:
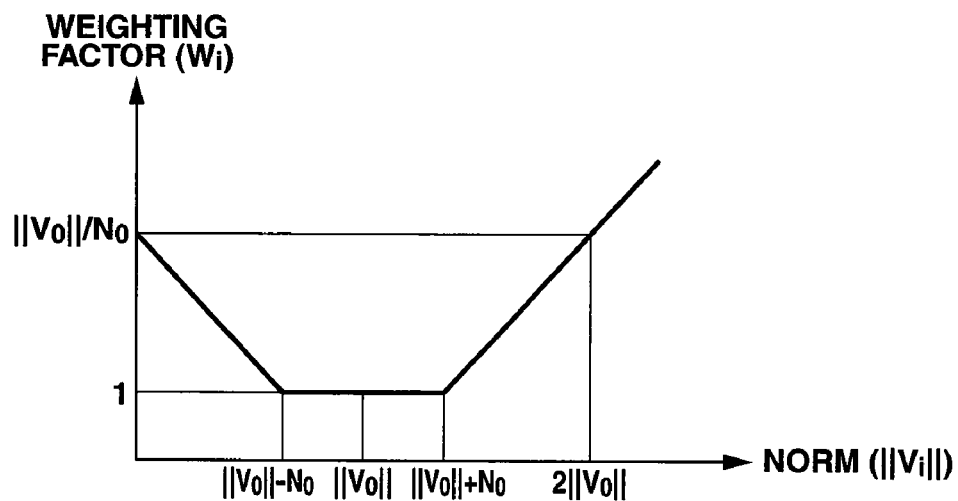
FIG. 6 is a line graph showing the function for calculating the weighting factor $w_i$ which relates to the vector signal in the neighborhood region according to Embodiment 1.
Figure 7:
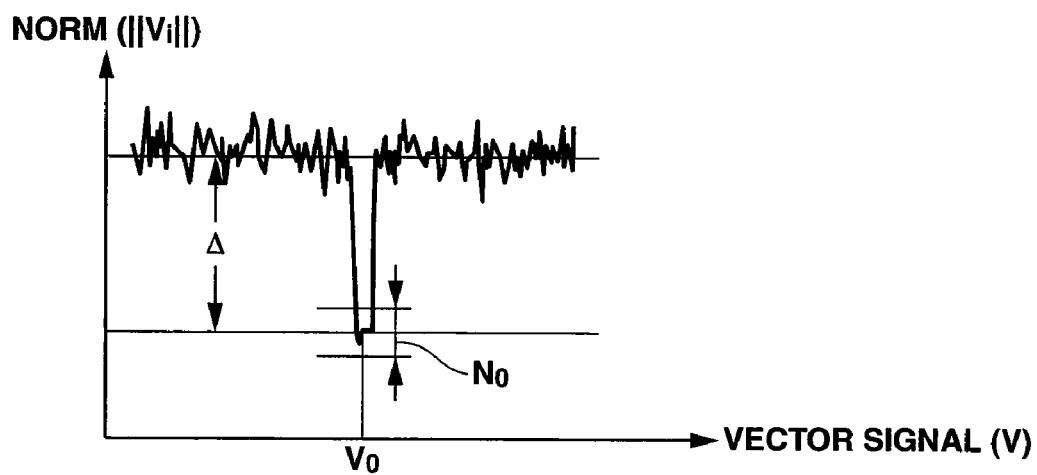
FIG. 7 is a line graph illustrating the process for calculating the weighting factor $w_0$ which relates to the vector signal in the target region according to Embodiment 1.
Figure 8:
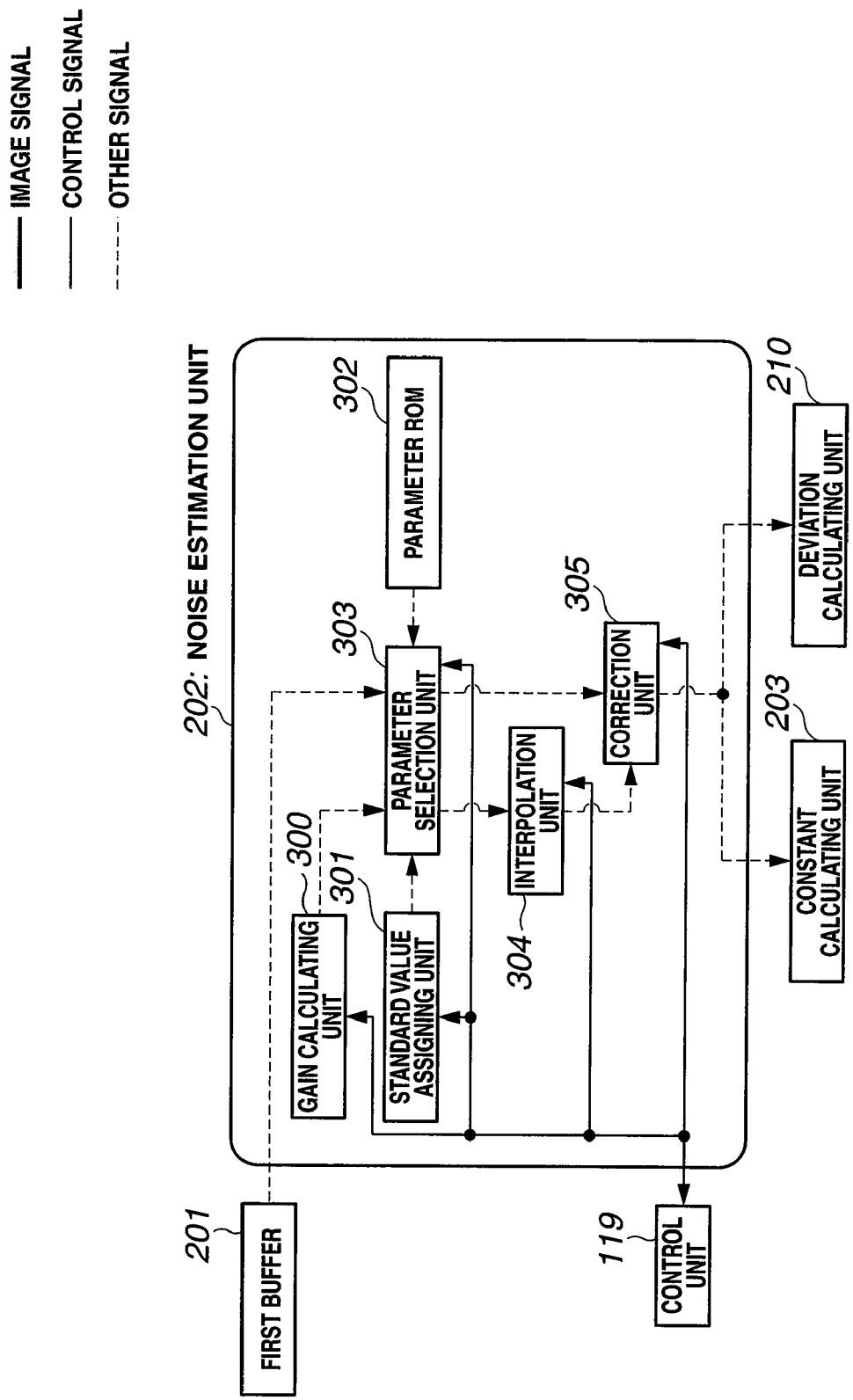
FIG. 8 is a block diagram showing a structure of a noise estimation unit according to Embodiment 1.
Figure 9:
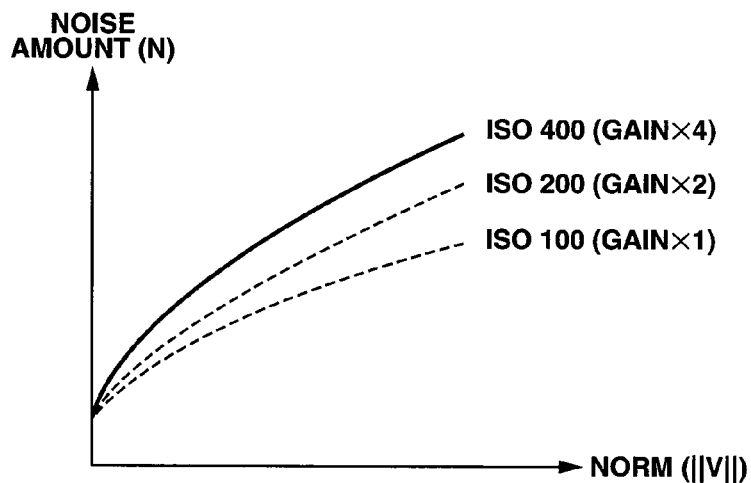
FIG. 9 is a line graph showing the relationship between the norm of the vector signal and the noise amount in Embodiment 1.
Figure 10:
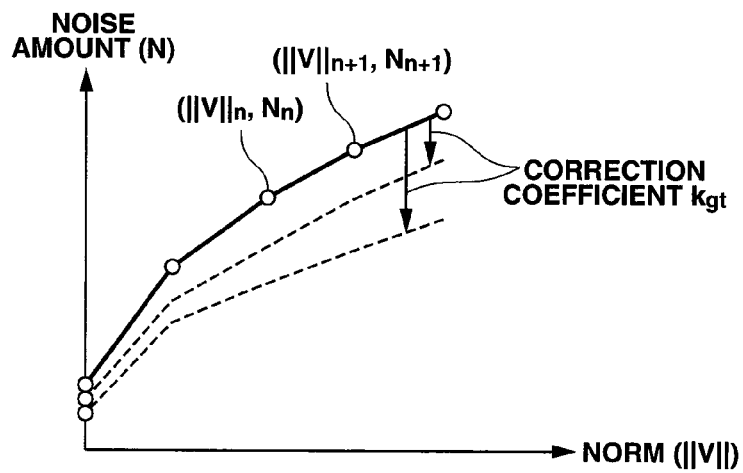
FIG. 10 is a line graph showing the noise model obtained by simplifying the noise model shown in FIG. 9.
Figure 11:
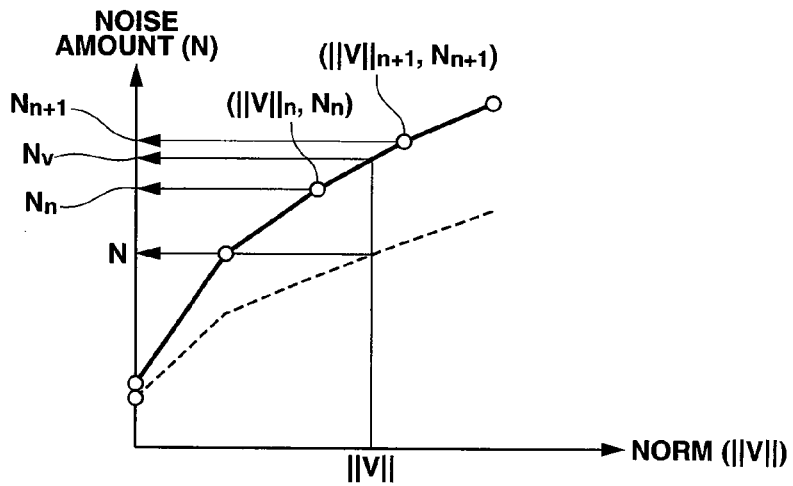
FIG. 11 is a line graph illustrating the process for calculating the noise amount using the simplified noise model shown in FIG. 10.
Figure 12:
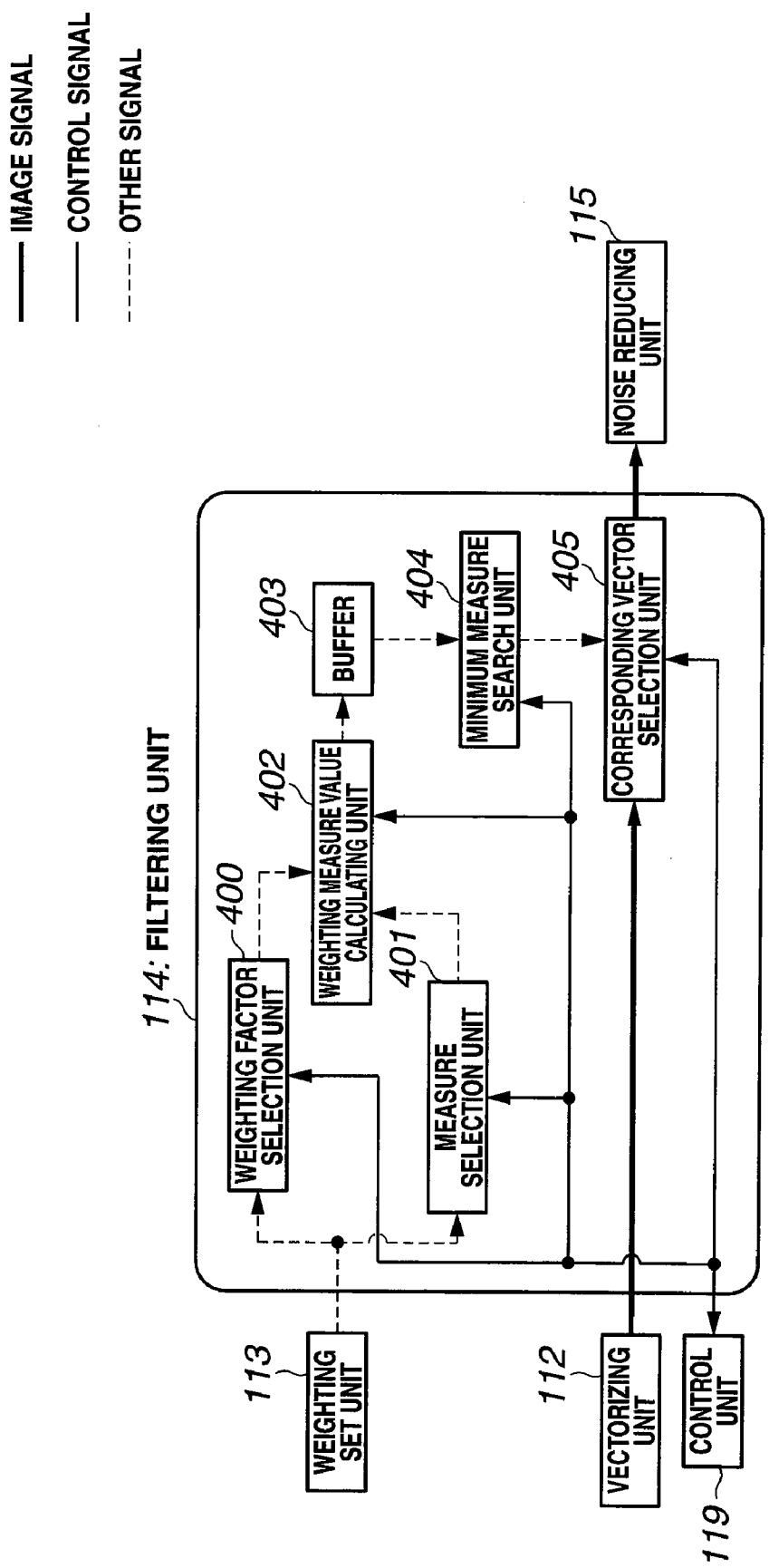
FIG. 12 is a block diagram showing the structure of a filtering unit according to Embodiment 1.
Figure 13:
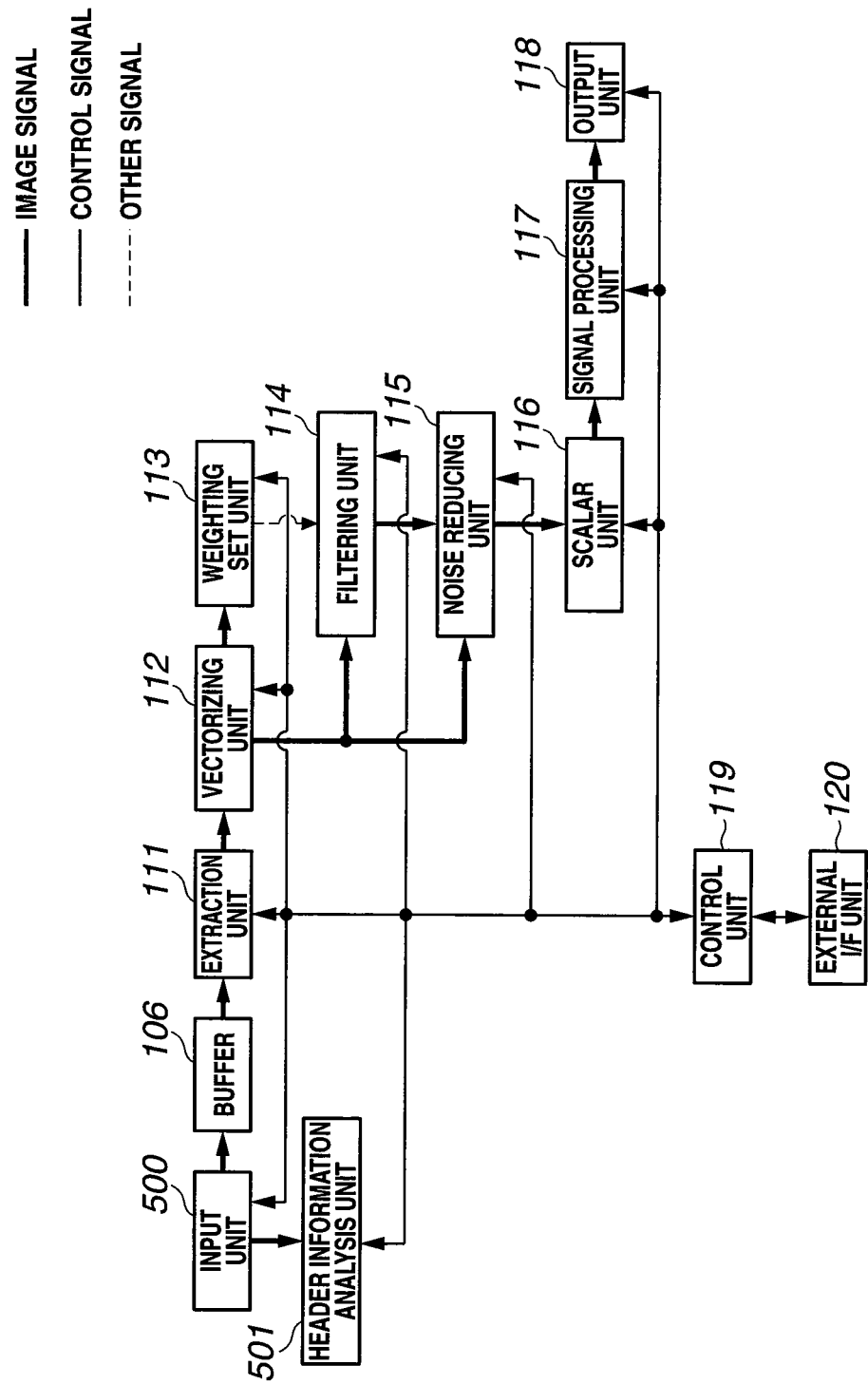
FIG. 13 is a block diagram showing another structure of the image processing system according to Embodiment 1.
Figure 14:
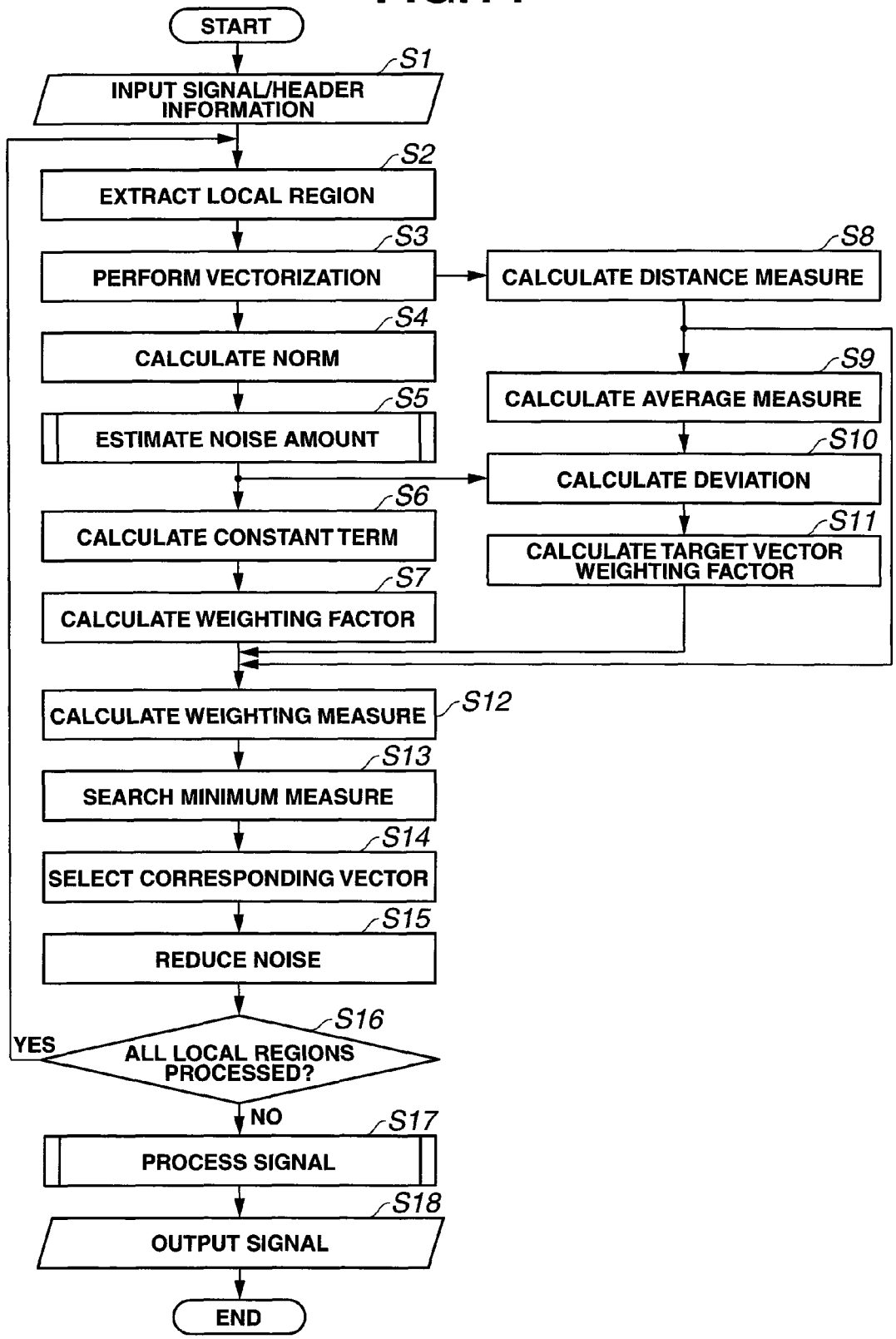
FIG. 14 is a flow chart showing the general signal processing routine executed based on the image processing program.
Figure 15:
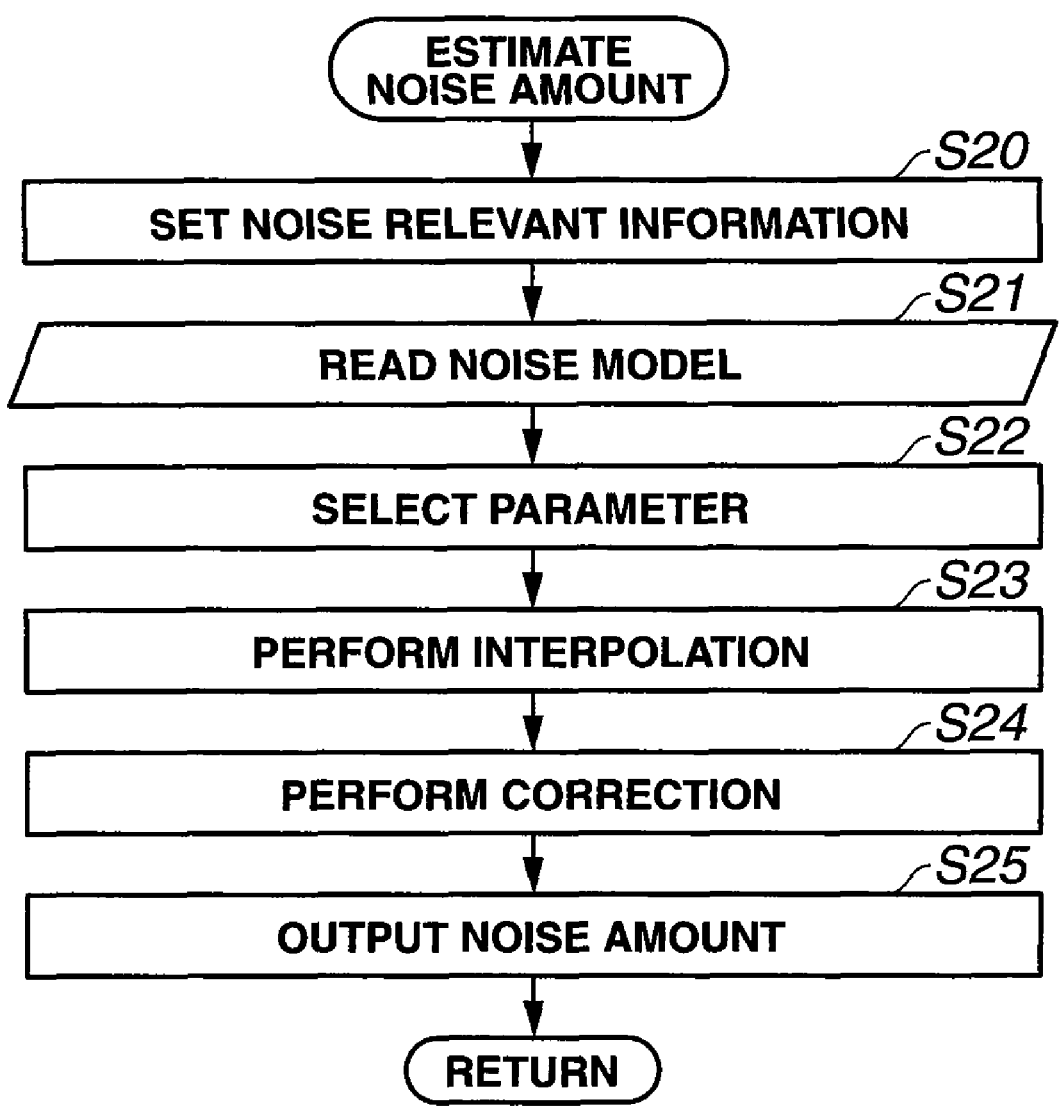
FIG. 15 is a flow chart showing the detail of the process for estimating the noise amount to be executed in step S5 shown in FIG. 14.

Embodiment 1 is shown in FIGS. 1 to 15. FIG. 1 is a block diagram of an image processing system. FIGS. 2A, 2B illustrate the structure of a local region as an example of Bayer-type 6×6 pixels, and vectorization of the signal in the local region. FIGS. 3A, 3B illustrate the structure of the local region as an example of Bayer-type 10×10 pixels, and vectorization of the signal in the local region. FIGS. 4A, 4B illustrate the structure of the local region as an example of the color-difference line-sequential type 6×6 pixels, and vectorization of the signal in the local region. FIG. 5 is a block diagram showing the structure of the weighting set unit. FIG. 6 is a line graph showing the function for calculating the weighting factor $w_i$ which relates to the vector signal in the neighborhood region. FIG. 7 is a line graph illustrating the process for calculating the weighting factor $w_0$ which relates to the vector signal in the target region. FIG. 8 is a block diagram showing a structure of a noise estimation unit. FIG. 9 is a line graph showing the relationship between the norm of the vector signal and the noise amount. FIG. 10 is a line graph showing the noise model obtained by simplifying the noise model shown in FIG. 9. FIG. 11 is a line graph illustrating the process for calculating the noise amount using the simplified noise model shown in FIG. 10. FIG. 12 is a block diagram showing the structure of a filtering unit. FIG. 13 is a block diagram showing another structure of the image processing system. FIG. 14 is a flow chart showing the general signal processing routine executed based on the image processing program. FIG. 15 is a flow chart showing the detail of the process for estimating the noise amount to be executed in step S5 shown in FIG. 14.

Referring to FIG. 1, the structure of the image processing system will be described. The image processing system according to the invention is applied to a digital camera as shown in FIG. 1.

The image processing system includes a lens system 100, an aperture 101, a CCD 102, a temperature sensor 103, an amplifier 104, an A/D converter 105, a buffer 106, a pre-white balance unit 107, an exposure control unit 108, a focus control unit 109, an AF motor 110, an extraction unit 111, a vectorizing unit 112, a weighting set unit 113, a filtering unit 114, a noise reducing unit 115, a scalar unit 116, a signal processing unit 117, an output unit 118, a control unit 119, and an external I/F unit 120.

The lens system 100 functions for forming an optical image of a subject into an image on an image pickup surface of the CCD 102.

The aperture 101 functions for defining a range where the luminous flux of the subject to be formed into the image by the lens system 100 passes to change the brightness of the optical image formed on the image pickup surface of the CCD 102.

The CCD 102 is an image pickup device for outputting a photoelectrically converted optical image to be formed into the image as the analog image signal. In the embodiment, a single CCD having Bayer-type primary color filter disposed on the front surface as shown in FIGS. 2A and 3A is employed as the CCD 102. However, not being limited thereto the single CCD having the color-difference line-sequential type color filter disposed on the front surface as shown in FIG. 4A may also be employed as the CCD 102. As the image pickup device, not only the CCD but also CMOS and the like may be employed.

The temperature sensor 103 is collection means which actually measures the temperature of the CCD 102 so as to be outputted to the control unit 119.

The amplifier 104 functions for amplifying the image signal outputted from the CCD 102. The amount of amplification performed by the amplifier 104 is set by the pre-white balance unit 107 and the exposure control unit 108 under the control of the control unit 119.

The A/D converter 105 converts the analog image signal outputted from the CCD 102 and amplified in the amplifier 104 into a digital image signal.

The buffer 106 temporarily records the digital image signal outputted from the A/D converter 105.

The pre-white balance unit 107 calculates a brief white balance coefficient by accumulating each color signal with a specified luminance level in the image signal recorded in the buffer 106 and controls the amplifier 104 in a pre-shooting mode.

The exposure control unit 108 obtains a luminance level of the image signal recorded in the buffer 106, and controls an aperture value of the aperture 101, an electronic shutter speed of the CCD 102 and an amplification factor of the amplifier 104 and the like in consideration with the set ISO sensitivity and the shutter speed at the limit of image stability, so that an appropriate exposure is obtained in the pre-shooting mode.

The focus control unit 109 detects an edge intensity of the image signal recorded in the buffer 106, and controls the AF motor 110 to maximize the edge intensity for obtaining the focused image in the pre-shooting mode.

The AF motor 110 serves as a drive source controlled by the focus control unit 109 to drive an AF lens of the lens system 100.

The extraction unit 111 serves as extraction means which sequentially extracts the local regions as shown in FIG. 2A (FIG. 3A or FIG. 4A) from the image signal recorded in the buffer 106 upon real shooting so as to be outputted into the vectorizing unit 112.

The vectorizing unit 112 serves as vectorizing means which vectorizes the image signal in the local region extracted by the extraction unit 111 (see FIGS. 2B, 3B, 4B) so as to be outputted to the weighting set unit 113, the filtering unit 114, and the noise reducing unit 115.

The weighting set unit 113 serves as set means which calculates the weighting factor with respect to all the vector signals in the local regions outputted from the vectorizing unit 112 so as to be transferred to the filtering unit 114 under the control of the control unit 119.

The filtering unit 114 serves as filtering means which filters the vector signals outputted from the vectorizing unit 112 using the weighting factor outputted from the weighting set unit 113, and transfers the resultant signal to the noise reducing unit 115 under the control of the control unit 119.

The noise reducing unit 115 serves as noise reducing means/averaging means which performs the noise reducing process with respect to the vector signal in the target region using the vector signal in the target region outputted from the vectorizing unit 112 and the filtered vector signal outputted from the filtering unit 114, and transfers the noise reduced vector signal to the scalar unit 116 under the control of the control unit 119.

The scalar unit 116 serves as scalar means which converts the noise reduced vector signal outputted from the noise reducing unit 115 into the inherent color signal of the CCD 102 or such color signal as R, Gr, Gb and B in the embodiment so as to be transferred to the signal processing unit 117 under the control of the control unit 119.

Each process performed by the extraction unit 111, the vectorizing unit 112, the weighting set unit 113, the filtering unit 114, the noise reducing unit 115, and the scalar unit 116 is performed for each local region synchronously under the control of the control unit 119.

The signal processing unit 117 subjects the noise reduced image signal outputted from the scalar unit 116 to the known interpolating process, the tone correction process, the compression process, and the like for transferring the processed signal to the output unit 118 under the control of the control unit 119.

The output unit 118 records the image signal outputted from the signal processing unit 117 into a recording medium such as a memory card so as to be stored therein.

The control unit 119 comprises a microcomputer bi-directionally connected to the amplifier 104, the A/D converter 105, the pre-white balance unit 107, the exposure control unit 108, the focus control unit 109, the extraction unit 111, the vectorizing unit 112, the weighting set unit 113, the filtering unit 114, the noise reducing unit 115, the scalar unit 116, the signal processing unit 117, the output unit 118, and the external I/F unit 120, which serves as control means for controlling the entire digital camera including the aforementioned components. The control unit 119 is structured to receive the signal from the temperature sensor 103 disposed around the CCD 102. The control unit 119 serves as collection means and gain calculating means.

The external I/F unit 120 is an interface which allows the user to perform the input operation to the digital camera to which the image processing system is applied, and includes a power switch for turning power ON/OFF, a shutter button for starting the shooting operation, a mode switch button for switching the shooting mode or other modes, and the like. The user is allowed to input for starting the pre shooting by pressing the first stage of the two-stage type shutter button, and further for starting the real shooting by pressing the second stage of the shutter button via the external I/F unit 120. The user is further allowed to set the ISO sensitivity and the like via the external I/F unit 120. The external I/F unit 120 outputs the input information to the control unit 119.

The operation of the digital camera as shown in FIG. 1 will be described along the processing path of the image signal.

The user preliminarily sets the shooting condition such as the ISO sensitivity via the external I/F unit 120.

The user presses the shutter button on the two-stage switch of the external I/F unit 120 halfway to bring the digital camera into the pre shooting mode.

Then the subject image to be formed into the image via the lens system 100 and the aperture 101 is photoelectrically converted by the CCD 102 so as to be outputted as the analog image signal.

The analog image signal is amplified by the amplifier 104 in consideration with the ISO sensitivity and the white balance (to be described later), and further converted into the digital image signal by the A/D converter 105 so as to be recorded in the buffer 106.

The image signal recorded in the buffer 106 is transferred to the pre-white balance unit 107, the exposure control unit 108, and the focus control unit 109, respectively.

The pre-white balance unit 107 calculates the simplified white balance factor based on the image signal as described above, and transfers the calculated simplified white balance factor to the amplifier 104. The amplifier 104 then sets the different gain for each color signal to amplify the respective color signals for performing the simplified white balance processing.

The exposure control unit 108 controls the aperture value of the aperture 101, the electronic shutter speed of the CCD 102, the amplification factor of the amplifier 104 and the like for the appropriate exposure based on the image signal.

The focus control unit 109 detects the edge intensity as described above, and controls the AF monitor 110 to maximize the edge intensity based on the image signal for obtaining the focused image.

After the adjustments of the focus, the exposure, and the simplified white balance, the user fully presses the shutter button on the two-stage switch of the external I/F unit 120 to bring the digital camera into the real shooting mode.

Then the image signal is transferred to the buffer 106 likewise the pre shooting. The real shooting is performed based on the simplified white balance factor obtained by the pre-white balance unit 107, the exposure condition derived from the exposure control unit 108, and the focus control condition derived from the focus control unit 109. Those shooting conditions are transferred to the control unit 119.

The image signal derived from the real shooting in the buffer 106 is first transferred to the extraction unit 111.

The extraction unit 111 sequentially extracts the local regions as shown in FIG. 2A so as to be transferred to the vectorizing unit 112 under the control of the control unit 119. The local region includes the target region and neighborhood regions therearound.

The vectorizing unit 112 obtains four-dimensional vector signal which contains components R, Gr, Gb and B from the target and the neighborhood regions as shown in FIG. 2B under the control of the control unit 119. The vectorizing unit 112 then transfers the obtained vector signal to the weighting set unit 113, the filtering unit 114, and the noise reducing unit 115, respectively.

The weighting set unit 113 calculates the weighting factor with respect to all the vector signals in the local regions using the vector signal in the target region under the control of the control unit 119, and transfers the calculated weighting factor to the filtering unit 114.

The filtering unit 114 subjects the vector signal from the vectorizing unit 112 to the filtering process using the weighting factor from the weighting set unit 113 under the control of the control unit 119, and the resultant signal is transferred to the noise reducing unit 115.

The noise reducing unit 115 subjects the vector signal in the target region to the noise reducing process using the vector signal in the target region from the vectorizing unit 112 and the filtered vector signal from the filtering unit 114 under the control of the control unit 119, and transfers the noise reduced vector signal to the scalar unit 116.

The scalar unit 116 converts the noise reduced vector signal from the noise reducing unit 115 into the inherent color signal of the image pickup device, or color signals of R, Gr, Gb and B in the present embodiment under the control of the control unit 119, and transfers the resultant signal to the signal processing unit 117.

The signal processing unit 117 performs the known interpolation process, the tone correction process, the compression process, and the like with respect to the noise reduced image signal outputted from the scalar unit 116 under the control of the control unit 119, and transfers the processed signal to the output unit 118.

The output unit 118 records the image signal outputted from the signal processing unit 117 in the recording medium such as the memory card so as to be stored therein.

Then the structure of the local region and vectorization of the image signal in the local region will be described referring to FIGS. 2A to 4B.

FIG. 2A shows the case where the 6×6 pixels as the local region is extracted.

The Bayer-type primary color filter shown in FIG. 2A includes a plurality of base units each containing a 2×2 pixels region. The base unit contains a red (R) filter and a blue (B) filter arranged at diagonal positions, and green filters (Gr, Gb) arranged at the other diagonal positions. Although the green filters Gr and Gb are the same, they are discriminated for convenience in the present embodiment. That is, the green filter on the same line of the red (R) filter is designated as Gr, and the green filter on the same line of the blue (B) filter is designated as Gb.

In the local region with 6×6 pixels size as shown in FIG. 2A, the target region with 2×2 pixels size ($R_4$, $Gr_4$, $Gb_4$, $B_4$) exists at the center. The neighborhood regions each with 2×2 pixels size enclose the target region so as to be arranged one line either in x-axis or y-axis overlapped with the adjacent neighborhood region. As the local region has the 6×6 pixels size, the number of the 2×2 pixels regions to be overlapped is 25 derived from the calculation of (6−1)×(6−1). As one of the calculated 25 regions becomes the target region, the total number of the neighborhood regions is 24.

The extraction unit 111 extracts the local region such that the target region covers the entire image signals (that is, the target region shifts by two pixels in x-axis or y-axis direction). In the case where the local region has the 6×6 pixels size, the extraction unit 111 extracts the local region so as to be overlapped with the adjacent local region in x-axis direction by 4 pixels, and with the adjacent local region in y-axis direction by 4 pixels, respectively.

FIG. 2B shows arrangement of vector signals corresponding to the target and the neighborhood regions generated by the vectorizing unit 112. The vector signal in the target region will be designated as $V_0$, and the vector signals in the neighborhood regions are designated as $V_i$ (i=1-24), respectively hereinafter.

In the case where the four-dimensional vector which contains components {R, Gr, Gb, B} is used for vectorizing the image signal, the vector signal $V_0$ in the target region shown in FIG. 2B is expressed by the following equation 1 in reference to FIG. 2A.

$$V_0=\{v_{01},v_{02},v_{03},v_{04}\}=\{R_4,Gr_4,Gb_4,B_4\} \quad \text{[Equation 1]}$$

The structure of the local region is not limited to the one shown in FIG. 2A. For example, it may be structured to have 10×10 pixels size as shown in FIG. 3A. In this case, the target region with the 2×2 pixels size ($R_{12}$, $Gr_{12}$, $Gb_{12}$, $B_{12}$) exists at the center. The neighborhood regions include the regions each with the 2×2 pixels size to enclose the target region therearound so as not to be overlapped with the adjacent neighborhood region. As the local region has the 10×10 pixels size, the number of the regions each with 2×2 pixels size arranged so as not to be overlapped is 25 derived from the calculation of (10/2)×(10/2). As one of the calculated regions is the target region, the total number of the neighborhood regions in the local region results in 24. In this case, the vector signal $V_0$ in the target region shown in FIG. 3B is expressed by the following equation 2 in reference to FIG. 3A.

$$V_0=\{v_{01},v_{02},v_{03},v_{04}\}=\{R_{12},Gr_{12},Gb_{12},B_{12}\} \quad \text{[Equation 2]}$$

The local region may have the arbitrary structure so long as the color signals R, Gr, Gb and B are contained as being necessary for vectorizing the target and the neighborhood regions. As described above, the local region is set to include 24 neighborhood regions which enclose one target region. However, not being limited thereto, the local region may be set to have the different number of the neighborhood regions with respect to the single target region.

In the aforementioned case, the CCD having the Bayer-type primary color filter disposed on the front surface is employed. However, the invention is not limited to the above structure. For example, the CCD having the color-difference line-sequential type complementary color filter disposed on the front surface may be employed as the CCD 102.

FIG. 4A shows the structure of the color-difference line-sequential type complementary color filter which includes base units each with the 2×2 pixels size where cyan (Cy) and yellow (Ye) are arranged on the same line of the 2×2 pixels, and magenta (Mg) and green (G) are arranged on the other same line of the 2×2 pixels, respectively. The positions of magenta (Mg) and green (G) are inverted for each line.

In the case where the region with 6×6 pixels size shown in FIG. 4A is extracted as the local region in the aforementioned structure, the target region with the 2×2 pixels ($Cy_4$, $Ye_4$, $Mg_4$, $G_4$) at the center of the local region is defined. The neighborhood regions include the regions each with the 2×2 pixels size to enclose the target region so as to be arranged to have overlapped with the adjacent neighborhood region by 1 pixel in y-axis or in x-axis direction, respectively. The number of the neighborhood regions in the local region is 24 likewise the aforementioned case as shown in FIG. 2A.

In this case, the vector signal $V_0$ in the target region shown in FIG. 4B is expressed by the following equation 3 in reference to FIG. 4A.

$$V_0=\{v_{01},v_{02},v_{03},v_{04}\}=\{Cy_4,Ye_4,Mg_4,G_4\} \quad \text{[Equation 3]}$$

Also in the case of the CCD having the color-difference line-sequential type complementary color filter disposed on the front surface, the local region with the arbitrary structure may be employed so long as the color signals of Cy, Ye, Mg and G required for vectorizing the target and the neighborhood regions are contained. The local region may also be structured to have any number of the neighborhood regions other than 24 for enclosing the single target region.

The image pickup device using an arbitrary color filter except for the Bayer-type color filter, the color-difference line-sequential type color filter and the like may be vectorized so long as the target and the local regions are set to contain all the color signals of the image pickup device. The vectorization may be performed n-dimensionally (n is the integer equal to or larger than 2, and more definitely, the integer equal to or larger than 3) other than four-dimensionally.

The weighting set unit 113 will be described referring to FIG. 5 illustrating the exemplary structure of the weighting set unit 113.

The weighting set unit 113 includes a norm calculating unit 200, a first buffer 201, a noise estimation unit 202, a constant calculating unit 203, a norm selection unit 204, a weighting factor calculating unit 205, a second buffer 206, a distance measure calculating unit 207, a third buffer 208, an average measure calculating unit 209, a deviation calculating unit 210, and a target vector weighting factor calculating unit 211.

The vectorizing unit 112 is connected to the norm calculating unit 200 and the distance measure calculating unit 207, respectively. The norm calculating unit 200 as norm calculating means is connected to the first buffer 201. The first buffer 201 is connected to the noise estimation unit 202 and the norm selection unit 204, respectively. The noise estimation unit 202 as noise estimation means is connected to the constant calculating unit 203 and the deviation calculating unit 210, respectively. The constant calculating unit 203 as constant calculating means is connected to the weighting factor calculating unit 205. The norm selection unit 204 is connected to the weighting factor calculating unit 205. The weighting factor calculating unit 205 as weighting factor calculating means is connected to the second buffer 206. The distance measure calculating unit 207 as average measure value calculating means is connected to the third buffer 208. The third buffer 208 is connected to the average measure calculating unit 209. The average measure calculating unit 209 as average measure value calculating means is connected to the deviation calculating unit 210. The deviation calculating unit 210 as deviation calculating means is connected to the target vector weighting factor calculating unit 211. The target vector weighting factor calculating unit 211 as the target vector weighting factor calculating means is connected to the second buffer 206. The second and the third buffers 206 and 208 are connected to the filtering unit 114, respectively.

The control unit 119 controls the norm calculating unit 200, the noise estimation unit 202, the constant calculating unit 203, the norm selection unit 204, the weighting factor calculating unit 205, the distance measure calculating unit 207, the average measure calculating unit 209, the deviation calculating unit 210, and the target vector weighting factor calculating unit 211 which are bi-directionally connected thereto.

The operation of the above-structured weighting set unit 113 will be described.

The norm calculating unit 200 reads the vector signal $V_0$ in the target region and the vector signal $V_i$ in the neighborhood region sequentially from the vectorizing unit 112 under the control of the control unit 119 so as to calculate norms of the respective vector signals.

That is, the norm calculating unit 200 first calculates the norm $\|V_0\|$ of the vector signal $V_0$ in the target region based on the definition shown in the following equation 4.

$$\|V_0\| = \sqrt{\sum_{j=1,4} (v_{0j})^2} \quad \text{[Equation 4]}$$

The norm calculating unit 200 calculates the norm $\|V_i\|$ of the vector signal $V_i$ in the neighborhood region using the following equation 5.

$$\|V_i\| = \sqrt{\sum_{j=1,4} (v_{ij})^2} \quad \text{[Equation 5]}$$

The norms calculated by the norm calculating unit 200 are transferred to the first buffer 201 so as to be recorded therein.

The noise estimation unit 202 reads the norm $\|V_0\|$ of the vector signal $V_0$ in the target region from the first buffer 201 under the control of the control unit 119, and obtains the shooting information from the control unit 109. The noise estimation unit 202 estimates a noise amount $N_0$ of the vector signal $V_0$ in the target region based on the read norm $\|V_0\|$ and the obtained shooting information, and further transfers the estimated noise amount $N_0$ to the constant calculating unit 203 and the deviation calculating unit 210, respectively. The noise estimation unit 202 transfers the norm $\|V_0\|$ of the vector signal $V_0$ in the target region to the constant calculating unit 203.

The constant calculating unit 203 reads the norm $\|V_0\|$ of the vector signal $V_0$ and the noise amount $N_0$ from the noise estimation unit 202, and calculates the constant term of the function for calculating the weighting factor with respect to the neighborhood region under the control of the control unit 119. In the present embodiment, three linear functions as shown in FIG. 6 are combined as the function for calculating the weighting factor with respect to the neighborhood region. The aforementioned function receives the input of the norm $\|V_i\|$ of the vector signal $V_i$ in the neighborhood region to output the weighting factor $w_i$ with respect to the vector signal. The use of the weighting factor $w_i$ may reduce the ratio of contribution of the vector signal $V_i$ different from the vector signal $V_0$ in the target region to be described later such that the edge structure is stored. The three linear functions as shown in FIG. 6 may be defined by the following equation 6.

$$w_i = \begin{cases} \frac{1}{N_0}\|V_i\| - \frac{\|V_0\|}{N_0} & (\|V_i\| > \|V_0\| + N_0) \\ 1 & (\|V_0\| + N_0 \geq \|V_i\| \geq \|V_0\| - N_0) \\ -\frac{1}{N_0}\|V_i\| + \frac{\|V_0\|}{N_0} & (\|V_0\| - N_0 > \|V_i\|) \end{cases} \quad \text{[Equation 6]}$$

Two terms of $1/N_0$ and $\|V_0\|/N_0$ are required for determining the function configuration as expressed by the equation 6 except for the difference in sign. The constant calculating unit 203 calculates the constant terms for those two terms so as to be transferred to the weighting factor calculating unit 205.

After the constant calculating unit 203 transfers the constant terms to the weighting factor calculating unit 205, the norm selection unit 204 selects the norm $\|V_i\|$ of the vector signal $V_i$ in the neighborhood region from the first buffer 201 sequentially and transfers the norm $\|V_i\|$ to the weighting factor calculating unit 205 under the control of the control unit 119.

The weighting factor calculating unit 205 calculates the weighting factor $w_i$ with respect to the norm $\|V_i\|$ of the vector signal $V_i$ in the neighborhood region transferred from the norm selection unit 204 based on the equation 6 so as to be transferred to the second buffer 206 under the control of the control unit 119.

Meanwhile, the distance measure calculating unit 207 reads the vector signal $V_0$ in the target region and the vector signal $V_i$ in the neighborhood region from the vectorizing unit 112 to calculate a distance measure value $d(V_k, V_l)$ (k=0-24; l=0-24) between two vector signals as expressed by the following equation 7 under the control of the control unit 119.

$$d(V_k, V_l) = \sqrt{\sum_{j=1,4}(v_{kj} - v_{lj})^2} \quad \text{[Equation 7]}$$

where the distance measure value $d(V_k, V_l)$ denotes the norm $\|V_k - V_l\|$ of the differential vector between the vector $V_k$ and the vector $V_l$.

In the present embodiment, as the local region includes 25 vector signals, the distance measure value is obtained by the calculation of 25×25=625. All the calculated distance measure values are transferred to the third buffer 208 so as to be recorded therein. The distance measure value has the symmetrical property with respect to the replacement, that is, $d(V_k, V_l) = d(V_l, V_k)$, and the norm calculated from the same vector signals becomes 0 ($d(V_k, V_k)=0$). Accordingly, the redundant calculation of the distance measure values may be omitted. It is enough to calculate 300 distance measure values ((625−25)/2).

The average measure calculating unit 209 reads the distance measure value $d(V_0, V_i)$ between the vector signal $V_0$ in the target region and the vector signal $V_i$ in the neighborhood region from the third buffer 208 under the control of the control unit 119. The average value $\Delta$ of the thus read distance measure values $d(V_0, V_i)$ is obtained using the following equation 8.

$$\Delta = \frac{\sum_{i=1,24} d(V_0, V_i)}{24} \quad \text{[Equation 8]}$$

The average value $\Delta$ calculated by the average measure calculating unit 209 is transferred to the deviation calculating unit 210.

The deviation calculating unit 210 reads the noise amount $N_0$ of the vector signal $V_0$ in the target region from the noise estimation unit 202, and the average value $\Delta$ from the average measure calculating unit 209 under the control of the control unit 119. The deviation calculating unit 210 calculates the deviation $\Delta/N_0$ between the vector signal in the target region and the vector signal in the neighborhood region based on the thus read noise amount $N_0$ and the average value $\Delta$, and transfers the calculated deviation $\Delta/N_0$ to the target vector weighting factor calculating unit 211.

The target vector weighting factor calculating unit 211 reads the deviation $\Delta/N_0$ from the deviation calculating unit 210, and obtains the weighting factor $w_0$ with respect to the vector signal $V_0$ in the target region as expressed by the following equation 9 using the thus read deviation $\Delta/N_0$ under the control of the control unit $$w_0 = \max\left(p\frac{\Delta}{N_0}, 1\right)$$ [Equation 9]

where max (x,y) at the right side represents that one of x and y as being not smaller than the other is selected to be used.

Calculation of the weighting factor $w_0$ with respect to the vector signal $V_0$ in the target region will be described referring to FIG. 7.

If the vector signal $V_0$ in the target region is the isolated point noise, the contribution is required to be reduced by increasing the weighting factor $w_0$ (the larger the weighting factor becomes, the smaller the ratio of the contribution becomes as described later). If the vector signal $V_0$ in the target region is not the isolated point noise, the contribution is required to be increased by reducing the weighting factor $w_0$.

It is necessary to obtain the rate of the vector signals $V_0$ in the target region becoming the isolated point noise for the purpose of determining the weighting factor $w_0$. For this, the average value $\Delta$ of the distance measure values $d(V_0, V_i)$ is divided by the noise amount $N_0$ as indicated by the equation 8 to obtain the significant difference between the vector signal $V_0$ in the target region and the other vector signal $V_i$. The probability that the vector signal $V_0$ in the target region is the isolated point noise is considered to be proportional to the aforementioned deviation $\Delta/N_0$. A "p" in the equation 9 denotes the parameter for adjustment as the value ranging from 0.2 to 0.8, for example.

The weighting factor $w_0$ calculated by the target vector weighting factor calculating unit 211 is transferred to the second buffer 206.

The second buffer 206 stores the weighting factor $w_i$ of the vector signal $V_i$ in the neighborhood region and the weighting factor $w_0$ of the vector signal $V_0$ in the target region.

The weighting factors $w_0$, $w_i$ stored in the second buffer 206 and the distance measure value $d(V_j, V_k)$ stored in the third buffer 208 are transferred to the filtering unit 114 when needed.

The noise estimation unit 202 will be described referring to FIG. 8 which shows an exemplary structure of the noise estimation unit 202.

The noise estimation unit 202 includes a gain calculating unit 300, a standard value assigning unit 301, a parameter ROM 302, a parameter selection unit 303, an interpolation unit 304, and a correction unit 305.

The first buffer 201 is connected to the parameter selection unit 303 as noise amount calculating means and parameter selection means. The gain calculating unit 300, the standard value assigning unit 301 and the parameter ROM 302 are connected to the parameter selection unit 303, respectively. The parameter selection unit 303 is connected to the interpolation unit 304 and the correction unit 305. The interpolation unit 304 as noise amount calculating means and reference noise amount calculating means is connected to the correction unit 305. The correction unit 305 as noise amount calculating means and reference noise amount correction means is connected to the constant calculating unit 203 and the deviation calculating unit 210, respectively.

The control unit 119 controls the gain calculating unit 300, the standard value assigning unit 301, the parameter selection unit 303, the interpolation unit 304, and the correction unit 305 which are bi-directionally connected thereto.

The operation of the above-structured noise estimation unit 202 will be described.

The parameter selection unit 303 reads the norm $\|V_0\|$ of the vector signal $V_0$ in the target region from the first buffer 201 under the control of the control unit 119.

Meanwhile, the gain calculating unit 300 as collection means and gain calculating means obtains the amount of amplification in the amplifier 104 based on at least one of the ISO sensitivity, the information (exposure information) with respect to the exposure condition, and the white balance information, transferred from the control unit 119, and transfers the obtained amount of amplification to the parameter selection unit 303.

The control unit 119 obtains the temperature information of the CCD 102 from the temperature sensor 103, and transfers the obtained temperature information to the parameter selection unit 303.

The parameter selection unit 303 estimates the noise amount $N_0$ of the vector signal $V_0$ in the target region based on the norm $\|V_0\|$ of the vector signal $V_0$ in the target region from the first buffer 201, the gain information from the gain calculating unit 300, and the temperature information from the control unit 119.

The estimation of the noise amount will be described referring to FIGS. 9 to 11.

The noise amount N shows the tendency to increase with the increase in the norm $\|V\|$ of the vector signal as shown in FIG. 9, which increases to form a curve of second order with respect to the norm $\|V\|$. The increase is modeled using a second order function to be expressed by the following equation 10.

$$N = \alpha\|V\|^2 + \beta\|V\| + \gamma$$ [Equation 10]

where $\alpha$, $\beta$, $\gamma$ denote the constant terms.

However, the noise amount N is changed not only in accordance with the change in the norm $\|V\|$ but also with the temperature of the image pickup device, and the gain to the image signal. For example, FIG. 9 shows curves formed by plotting the noise amounts N with respect to the three kinds of ISO sensitivities relative to the gain, that is, 100 (gain x1), 200 (gain x2), and 400 (gain x 4), respectively.

The respective curves shown in FIG. 9 are configured in accordance with the equation 10. However, the coefficients are different depending on the ISO sensitivity relevant to the gain. The noise amount N is also changed depending on the temperature of the image pickup device, and generally shows the increasing tendency with the increase in the temperature of the image pickup device.

Assuming that the gain is designated as g, and the temperature is designated as t, when the noise model is formulated in consideration with the dependency of the noise amount N on the gain g and the temperature t, the following equation 11 is obtained.

$$N = \alpha_{gt}\|V\|^2 + \beta_{gt}\|V\| + \gamma_{gt}$$ [Equation 11]

where $\alpha_{gt}$, $\beta_{gt}$, $\gamma_{gt}$ denote the constant terms defined by the gain g and the temperature t.

As storage of a plurality of the functions as shown in the equation 11 for calculating the noise amount may exert high load to the processing, the model is simplified as shown in FIG. 10. That is, the model which imparts the maximum noise amount is selected as a reference noise model, and this is approximated with a predetermined number of broken lines. Then inflection points of the broken lines may be expressed by coordinate data ($\|V\|_n$, $N_n$) formed of the norm $\|V\|$ and the noise amount N. The n denotes the number of the inflection points. Further, a correction coefficient $k_{gt}$ for obtaining another noise model from the reference noise model is prepared. The correction coefficient $k_{gt}$ is calculated through the least square method using the respective noise models and the reference noise model. The thus calculated correction coefficient $k_{gt}$ is multiplied by the reference noise model to obtain another noise model.

Referring to FIG. 11, the method for calculating the noise amount using the simplified noise model as shown in FIG. 10 will be described.

For example, let us assume obtaining the noise amount N corresponding to the given norm ∥v∥, with the gain g, and the temperature t, the section of the reference noise model in which the norm ∥v∥ exists is searched. Supposing that the norm ∥v∥ exists in the section between $(\|V\|_n, N_n)$ and $(\|V\|_{n+1}, N_{n+1})$, the reference noise amount $N_v$ of the reference noise model is obtained by the linear interpolation as shown by the following equation 12.

$$N_v = \frac{N_{n+1} - N_n}{\|V\|_{n+1} - \|V\|_n}(\|v\| - \|V\|_n) + N_n \qquad \text{[Equation 12]}$$

Then the noise amount N is obtained by multiplying the correction coefficient $k_{gt}$.

$$N = k_{gt} \cdot N_v \qquad \text{[Equation 13]}$$

Referring to FIG. 8, the parameter selection unit 303 reads the norm $\|V_0\|$ f the vector signal $V_0$ in the target region from the first buffer 201, and sets the gain g based on the amount of amplification in the amplifier 104 from the gain calculating unit 300 and the temperature t based on the temperature information from the control unit 119, respectively.

The parameter selection unit 303 searches the coordinate data $(\|V\|_n, N_n)$ and $(\|V\|_{n+1}, N_{n+1})$ corresponding to the section where the norm $\|V_0\|$ exists from the parameter ROM 302 as noise amount calculating means and parameter selection means, and transfers the data to the interpolation unit 304.

The parameter selection unit 303 searches the correction coefficient $k_{gt}$ corresponding to the gain g and the temperature t from the parameter ROM 302, and transfers the searched correction coefficient $k_{gt}$ to the correction unit 305.

The interpolation unit 304 calculates the reference noise amount $N_v$ of the reference noise model based on the equation 12 using the norm $\|V_0\|$ and the section coordinate data $(\|V\|_n, N_n)$ and $(\|V\|_{n+1}, N_{n+1})$ from the parameter selection unit 303, and transfers the calculated reference noise amount $N_v$ to the correction unit 305 under the control of the control unit 119.

The correction unit 305 calculates the noise amount N based on the equation 13 using the correction coefficient $k_{gt}$ from the parameter selection unit 303 and the reference noise amount $N_v$ from the interpolation unit 304 under the control of the control unit 119. The correction unit 305 transfers the calculated noise amount N to the constant calculating unit 203 and the deviation calculating unit 210 as the noise amount $N_0$ of the vector signal $V_0$ in the target region, respectively.

Note, it is not necessarily to obtain information such as the temperature t and the gain g required when the correction coefficient $k_{gt}$ is searched by the parameter selection unit 303 for each shooting. That is, the arbitrary information is recorded in the standard value assigning unit 301 as the assigning means to omit the calculating step. This makes it possible to perform the high speed processing and to save power consumption.

The filtering unit 114 will be described referring to FIG. 12 illustrating the exemplary structure thereof.

The filtering unit 114 includes a weighting factor selection unit 400, a measure selection unit 401, a weighting measure value calculating unit 402, a buffer 403, a minimum measure search unit 404, and a corresponding vector selection unit 405.

The weighting set unit 113 is connected to the weighting factor selection unit 400 and the measure selection unit 401, respectively. The weighting factor selection unit 400 and the measure selection unit 401 are connected to the weighting measure value calculating unit 402, respectively. The weighting measure value calculating unit 402 as the weighting measure value calculating means is connected to the corresponding vector selection unit 405 as the output means via the buffer 403 and the minimum measure search unit 404. The vectorizing unit 112 is connected to the corresponding vector selection unit 405. The corresponding vector selection unit 405 is connected to the noise reducing unit 115.

The control unit 119 controls the weighting factor selection unit 400, the measure selection unit 401, the weighting measure value calculating unit 402, the minimum measure search unit 404, and the corresponding vector selection unit 405, which are bi-directionally connected thereto.

The operation of the above-structured filtering unit 114 will be described.

The weighting factor selection unit 400 sequentially reads the weighting factors $w_k$ (k=0-24) which relate to the vector signal in the local region from the weighting set unit 113 so as to be transferred to the weighting measure value calculating unit 402 under the control of the control unit 119.

The measure selection unit 401 sequentially reads the distance measure value $d(V_k, V_l)$ (k=0-24, l=0-24) between the vector signals in the local region from the weighting set unit 113 so as to be transferred to the weighting measure value calculating unit 402 under the control of the control unit 119.

The weighting measure value calculating unit 402 calculates a total value $T_k$ of the weighted measure value for each vector signal as shown in the equation 14 under the control of the control unit 119.

$$T_k = \sum_{l=0,24} w_l \cdot d(V_k, V_l) \qquad \text{[Equation 14]}$$

The total value $T_k$ of the weighted measure value calculated by the weighting measure value calculating unit 402 is transferred to the buffer 403 so as to be recorded. Each processing in the weighting factor selection unit 400, the measure selection unit 401, and the weighting measure value calculating unit 402 is synchronously performed for the unit of the vector signal under the control of the control unit 119.

The minimum measure search unit 404 as search means searches the minimum value $T_{min}$ from the total value $T_k$ of the weighting measure values under the control of the control unit 119 after calculation of the total value $T_k$ of the weighting measure values with respect to all the vector signals in the local region. The searched minimum value $T_{min}$ is transferred from the minimum measure search unit 404 to the corresponding vector selection unit 405.

The corresponding vector selection unit 405 selects the vector signal $V_{min}$ corresponding to the minimum value $T_{min}$ from the vectorizing unit 112 using the minimum value $T_{min}$ from the minimum measure search unit 404, and transfers the selected vector signal $V_{min}$ to the noise reducing unit 115 under the control of the control unit 119.

The noise reducing unit 115 obtains the weighting average of the vector signal $V_0$ in the target region from the vectorizing unit 112 and the output vector signal $V_{min}$ through filtering from the filtering unit 114 as shown in the following equation 15 to provide the noise reduced vector signal $V'_0$ under the control of the control unit 119.

$$V'_0 = kV_0 + (1-k)V_{min} \quad \text{[Equation 15]}$$

where k denotes the predetermined constant term set to the value in the range from 0 to 1.

In the aforementioned embodiment, the digital camera has been described as the image processing system integrally formed with the image pickup portion including the lens system 100, the aperture 101, the CCD 102, the temperature sensor 103, the amplifier 104, the A/D converter 105, the pre-white balance unit 107, the exposure control unit 108, the focus control unit 109, and the AF motor 110.

The image processing system is not limited to the one as described above. For example, the image pickup portion may be separately formed as shown in FIG. 13. The image processing system shown in FIG. 13 allows the separately formed image pickup portion to perform the shooting operation such that the image signal recorded in the recording medium such as the memory card in the form of unprocessed Raw data is read and processed. In this case, the information accompanying the image signal such as the shooting condition is assumed to be recorded in the recording medium as the header information. Transmission of the various information data from the separately formed image pickup portion to the image processing system is performed through the recording medium. However, the transmission of the information data from the separately formed image pickup portion to the image processing signal may also be performed through the communication line or the like.

The image processing system shown in FIG. 13 is structured by eliminating the lens system 100, the aperture 101, the CCD 102, the temperature sensor 103, the amplifier 104, the A/D converter 105, the pre-white balance unit 107, the exposure control unit 108, the focus control unit 109 and the AF motor 110 from the structure of the image processing system shown in FIG. 1 and adding an input unit 500 and a header information analysis unit 501 thereto. The other basic structure of the image processing system shown in FIG. 13 is the same as the one shown in FIG. 1. The same components as those shown in FIG. 1 will be designated with the same names and reference numerals, and only the different feature will be described while omitting the explanation with respect to the same features.

The input unit 500 is connected to the buffer 106 and the header information analysis unit 501. The control unit 119 controls the input unit 500 and the header information analysis unit 501 which are bi-directionally connected thereto.

The operation of the image processing system as the different feature shown in FIG. 13 will be described.

For example, when the reproducing operation is started via the external I/F unit 120 such as the mouse and the keyboard, the image signal and the header information stored in the recording medium such as the memory card are read via the input unit 500.

The image signal and the header information of the information data read from the input unit 500 are transferred to the buffer 106 and the header information analysis unit 501, respectively.

The header information analysis unit 501 extracts the information upon shooting, that is, the exposure condition, ISO sensitivity, white balance information, temperature of the image pickup device based on the header information transferred from the input unit 500 so as to be transferred to the control unit 119.

The subsequent process steps are the same as those of the image processing system shown in FIG. 1.

The aforementioned structure requires the hardware to perform the processing. However, it is not limited to the structure as described above. For example, the image signal from the CCD 102 is recorded in the recording medium such as the memory card in the form of the unprocessed Raw data, and the accompanying information such as the shooting condition is also recorded in the recording medium as the header information. Then the image processing program as the software is executed by the computer. The information stored in the recording medium is read by the computer so as to be processed. The transmission of the various information data from the image pickup portion to the computer is not limited to the structure via the recording medium but the transmission via the communication line may also be allowed.

The main routine of the processing based on the image processing program will be described referring to FIG. 14.

When the routine starts, the image signal and the header information such as the gain are read (step S1).

The local region with the 6×6 pixels size including the target region and the neighborhood regions as shown in FIG. 2A is sequentially extracted (step S2).

A total of 25 vector signals as shown in FIG. 2B are obtained (step S3).

The norm of the vector signal is calculated as shown in the equation 4 (step S4).

Thereafter, the noise amount of the vector signal in the target region is estimated to be described later referring to FIG. 15 (step S5).

The constant terms for a plurality of linear functions shown in the equation 6 are calculated using the calculated norm of the vector signal and the estimated noise amount (step S6).

The weighting factor of the vector signal $V_i$ in the neighborhood region is calculated using the plurality of the linear functions shown in the equation 6 having the constant term set (step S7).

The distance measure value shown in the equation 7 is calculated based on the vector signal obtained in step S3 (step S8).

The average measure value as shown in the equation 8 is calculated based on the distance measure value of the target vector (step S9).

The deviation is calculated based on the average measure value calculated in step S9 and the noise amount of the target vector estimated in step S5 (step S10).

As shown in the equation 9, the weighting factor with respect to the vector signal $V_0$ in the target region is calculated (step S11).

The total value of the weighted measure value is calculated as shown in the equation 14 using the weighting factor of the vector signal $V_i$ in the neighborhood region calculated in step S7, the weighting factor of the vector signal $V_0$ in the target region calculated in step S11, and the distance measure value calculated in step S8 (step S12).

The minimum value is searched from the calculated total values of the weighted measure value (step S13), and the vector signal corresponding to the total of the minimum weighted measure value is selected (step S14).

The vector signal obtained in step S14 and the vector signal of the target vector are weighted averaged to calculate the noise reduced vector signal (step S15).

It is determined whether or not all the local regions have been processed (step S16). If it is determined that all the local regions have not been processed yet, the process returns to step S2 where the processing of the subsequent local region will be repeatedly performed.

If it is determined that all the local regions have been processed, the signal processing including the known interpolation, the tone correction, the compression and the like is performed (step S17). The signal obtained after the processing is outputted (step S18) to end the routine.

The process for estimating the noise amount in step S5 shown in FIG. 14 will be described referring to FIG. 15.

In step S5 shown in FIG. 14, upon start of the routine, the noise relevant information such as temperature, gain and the like, are set from the read header information (step S20). If the header information contains no required parameter, the predetermined standard values are assigned.

The coordinate data of the reference noise model and the correction coefficient as shown in FIG. 10 are read in (step S21).

The coordinate data corresponding to the section where the norm of the vector signal $V_0$ in the target region exists are selected (step S22).

The interpolation is performed as shown in the equation 12 to obtain the reference noise amount (S23). The correction is performed as shown in the equation 13 to obtain the noise amount (step S24).

Thereafter, the calculated noise amount is outputted (step S25), and the process returns to the main routine shown in FIG. 14.

In Embodiment 1, the image signal is vectorized, the noise amount in the vector space is estimated, and the weighting factors with respect to each vector signals are set based on the estimated noise amount. The filtering is performed using the set weighting factors, and the noise reducing process may be performed based on the filtering results. This makes it possible to perform the highly accurate noise reducing process with respect to the entire noise while suppressing the adverse effect such as deterioration in the edge regions and the change in the hue.

Once the parameters such as p in the equation 9 and k in the equation 15 are set, they may be fixed, thus eliminating the need for setting the parameter. This allows the high speed processing to be automatically performed.

The noise amount may be dynamically estimated conforming to the conditions including the norm of the vector signal, the temperature of the image pickup device upon shooting, and the gain which dynamically change. This makes it possible to execute the filtering using the optimum weighting factors, resulting in the highly accurate noise reducing process.

When the information with respect to the condition which dynamically changes cannot be obtained, the noise amount may be estimated using the standard value, thus providing the stable noise reducing effect.

Calculation of some of the parameters may be intentionally omitted to form the image processing system capable of reducing the cost and saving power.

The use of the noise model allows the noise amount estimation with high accuracy.

The use of the simplified noise model allows the interpolation and correction based on the simplified noise model to be easily performed, thus forming the system at reduced cost. As the memory size required for the simplified noise model may also be reduced, the cost may further be decreased.

Meanwhile, as a plurality of linear functions are combined into the function for calculating the weighting factors, the constant term may be easily calculated, resulting in the high speed processing at low costs.

The weighting factor of the vector signal in the target region is calculated separately from calculation of the weighting factors of the vector signals in the neighborhood regions, the accuracy in filtering the spike noise may be improved, resulting in the noise reduction with higher accuracy.

As the distance measure value is used as the measure value, the accuracy in the noise reduction process with respect to the luminance noise may be improved.

The vector signal derived from the filtering and the inherent vector signal are weighted averaged to suppress generation of the false contour, performing the noise reducing process in subjectively preferable way.

The single CCD having the Bayer-type primary color filter or the color-difference line-sequential type complementary color filter disposed on the front surface is employed as the image pickup device, which is highly compatible with the generally employed image pickup portion. This makes it possible to be easily applied to various types of the image processing systems.

As the vector signal is returned to the inherent color signal of the image pickup device after the noise reducing process, the compatibility with the processing system in the subsequent stage may be maintained, thus allowing combination of various systems.

Embodiment 2

Figure 16:
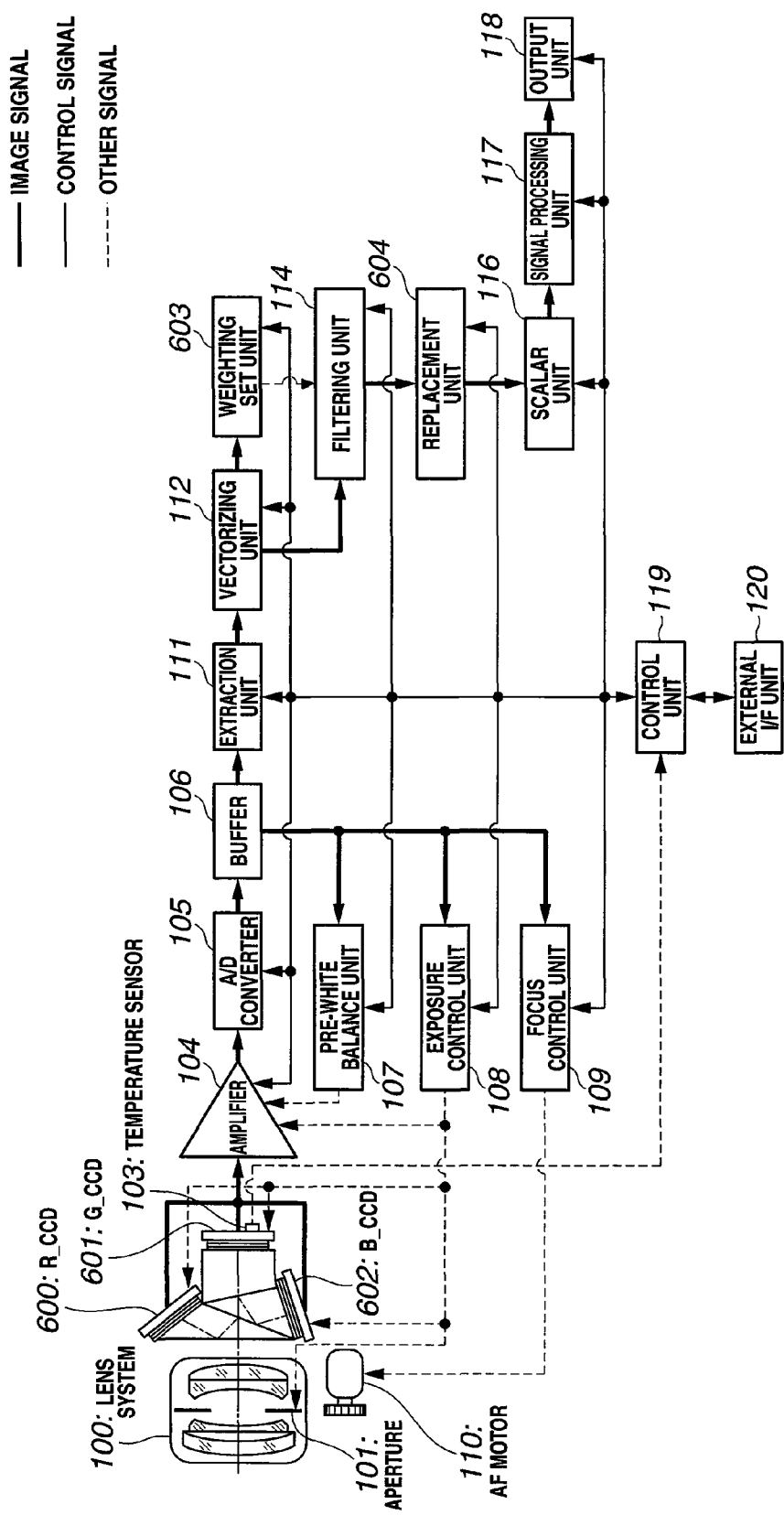
FIG. 16 is a block diagram showing the structure of an image processing system according to Embodiment 2.
Figure 18:
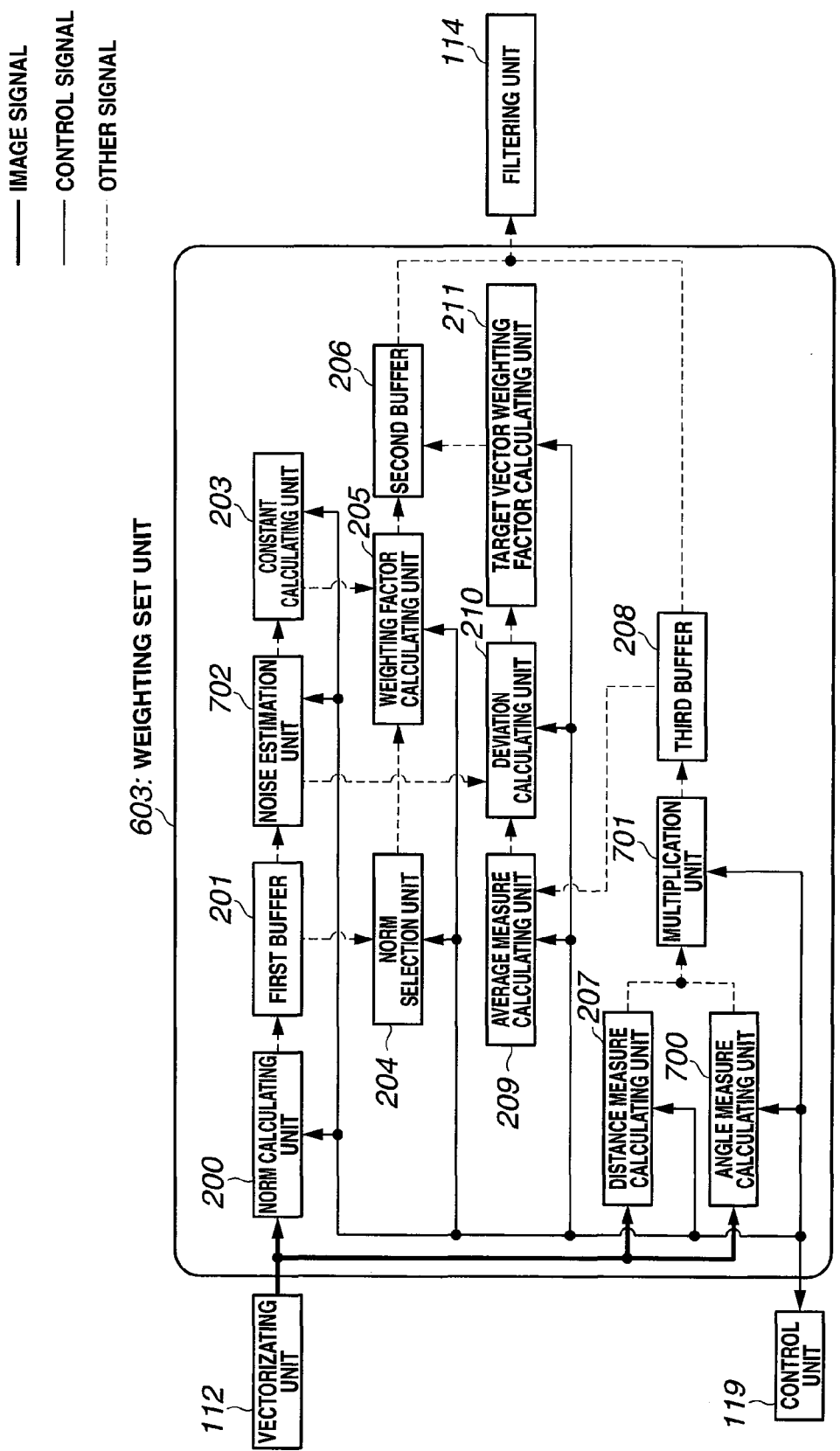
FIG. 18 is a block diagram showing the structure of the weighting set unit according to Embodiment 2.
Figure 19:
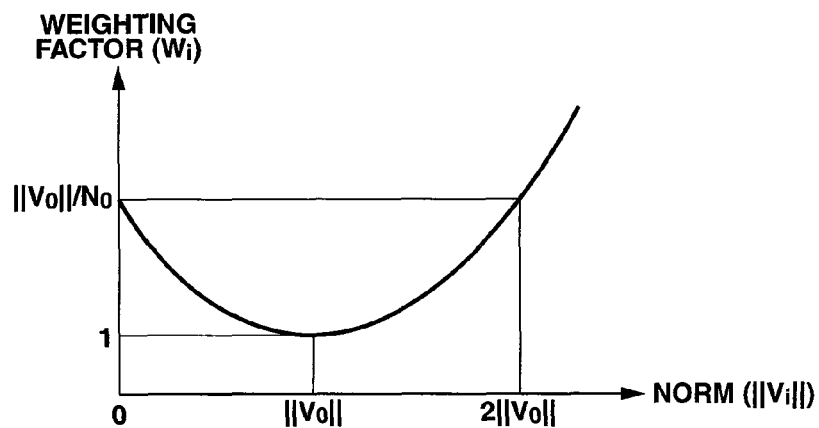
FIG. 19 is a line graph illustrating the function for calculating the weighting factor $w_i$ which relates to the vector signal in the neighborhood region according to Embodiment 2.
Figure 20:
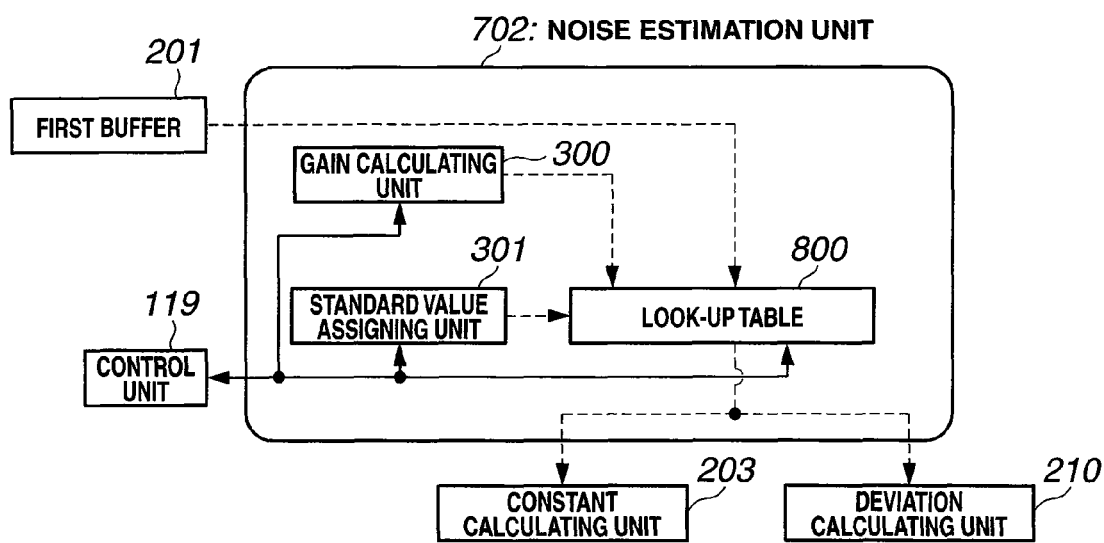
FIG. 20 is a block diagram showing the structure of the noise estimation unit according to Embodiment 2.
Figure 21:
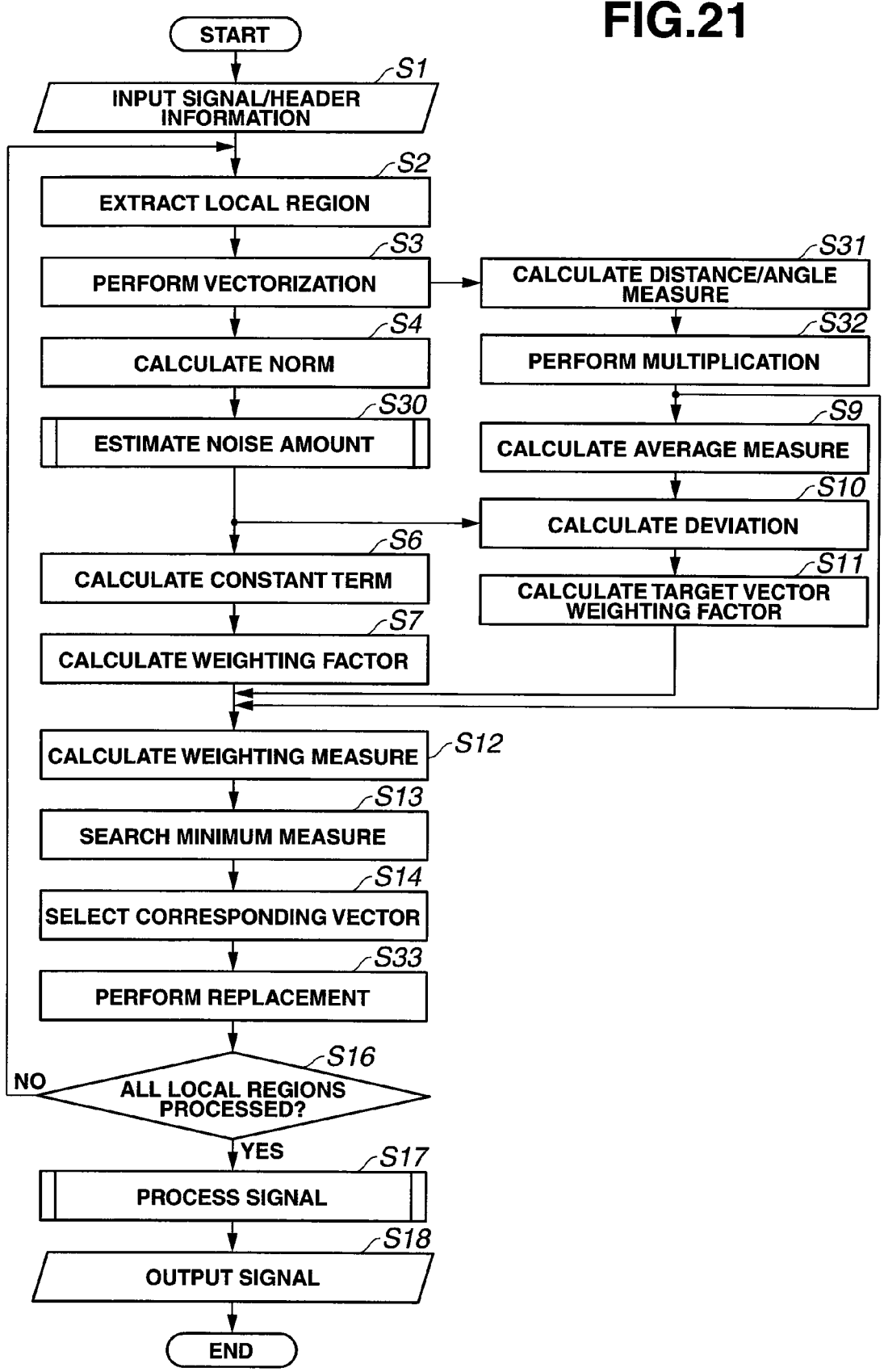
FIG. 21 is a flow chart showing the general signal processing routine executed based on the image processing program according to Embodiment 2.
Figure 22:
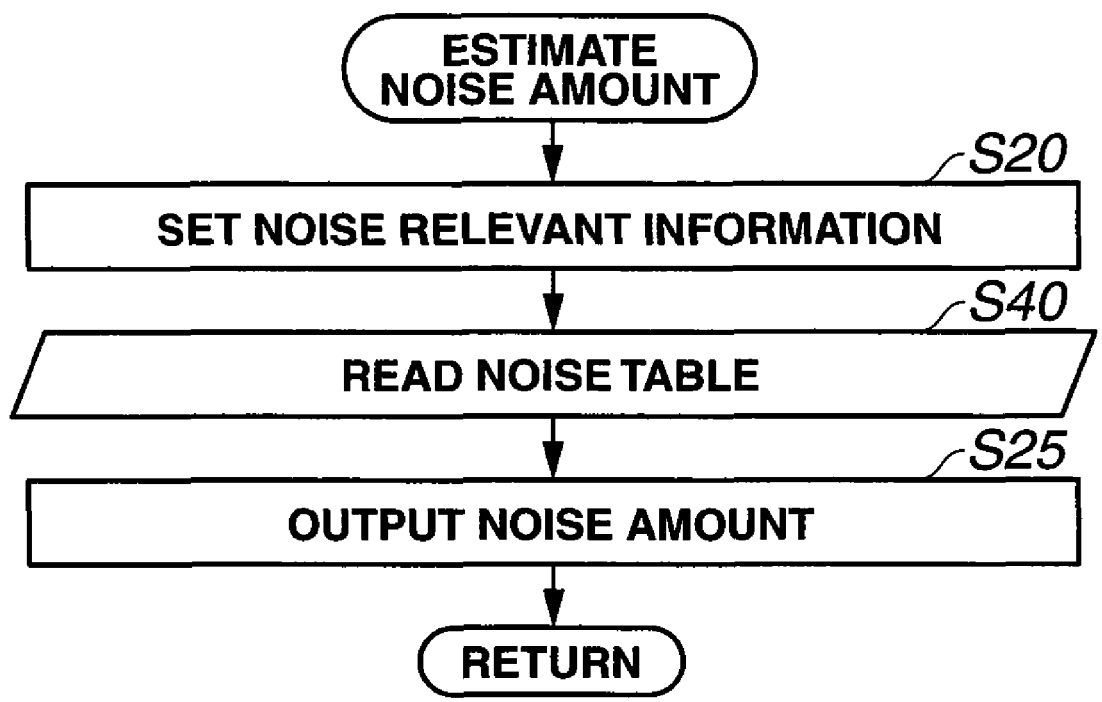
FIG. 22 is a flow chart showing the detail of the process for estimating the noise amount in step S30 shown in FIG. 21.

Embodiment 2 is shown in FIGS. 16 to 22. FIG. 16 is a block diagram showing the structure of an image processing system. FIGS. 17A, 17B, 17C, 17D show the structure of the local region of three CCD with 5×5 pixels size, and vectorization of the signal in the local region. FIG. 18 is a block diagram showing the structure of the weighting set unit. FIG. 19 is a line graph illustrating the function for calculating the weighting factor $w_i$ which relates to the vector signal in the neighborhood region. FIG. 20 is a block diagram showing the structure of the noise estimation unit. FIG. 21 is a flow chart showing the general signal processing routine executed based on the image processing program. FIG. 22 is a flow chart showing the detail of the process for estimating the noise amount in step S30 shown in FIG. 21.

In Embodiment 2, the same components as those in Embodiment 1 will be designated with the same codes, and explanations thereof, thus will be omitted. Only the different feature will be described.

Referring to FIG. 16, the structure of the image processing system applied to the digital camera will be described.

The image processing system shown in FIG. 16 is formed by partially modifying the image processing system according to Embodiment 1 as shown in FIG. 1. The image processing system is formed by replacing the CCD 102 with R_CCD 600, G_CCD 601 and B_CCD 602, replacing the weighting set unit 113 with a weighting set unit 603, replacing the noise reducing unit 115 with a replacement unit 604 as noise reducing means and replacement means. The R_CCD 600, the G_CCD 601 and the B_CCD 602 are provided with dichroic prism to split the incident luminous flux into three-color components of RGB. In the exemplary structure shown in FIG. 16, the temperature sensor 103 is provided around the G_CCD 601. Other basic structures are the same as those of Embodiment 1, and the same components are designated with the same reference numerals.

Only the different feature will be mainly described hereinafter. The luminous flux that has passed through the lens system 100 and the aperture 101 is split into three colors of RGB by the dichroic prism such that the light with R, G and B components are guided to the R_CCD 600, G_CCD 601, and B_CCD 602, respectively.

The R_CCD 600, G_CCD 601 and B_CCD 602 are connected to the amplifier 104, respectively.

The vectorizing unit 112 is connected to the weighting set unit 603 and the filtering unit 114.

The weighting set unit 603 as the set means is connected to the filtering unit 114. The filtering unit 114 is connected to the replacement unit 604. The replacement unit 604 is connected to the scalar unit 116, respectively.

The control unit 119 controls the R_CCD 600, the G_CCD 601, the B_CCD 602, the weighting set unit 603, and the replacement unit 604, which are bi-directionally connected thereto.

The operation of the above-structured image processing system shown in FIG. 16 will be described along with the processing path of the image signal. As the operation of the image processing system according to Embodiment 2 is basically the same as that of the image processing system according to Embodiment 1, only the different feature will be mainly described.

An R signal outputted from the R_CCD 600, a G signal outputted from the G_CCD 601 and a B signal outputted from the B_CCD 602 are amplified by the amplifier 104, respectively, and converted into digital signals by the A/D converter 105 so as to be transferred to the buffer 106 and temporarily recorded therein.

The image signal recorded in the buffer 106 is further transferred to the extraction unit 111.

The extraction unit 111 sequentially extracts local regions corresponding to the R signal shown in FIG. 17A, the G signal shown in FIG. 17B, and the B signal shown in FIG. 17C, which are transferred to the vectorizing unit 112 under the control of the control unit 119. The local region includes the target region and the neighborhood regions therearound as described above.

The vectorizing unit 112 obtains three-dimensional vector signal which contains components (R, G, B) shown in FIG. 17D from the signals in the target region and the neighborhood regions shown in FIGS. 17A to 17C so as to be transferred to the weighting set unit 603 and the filtering unit 114, respectively under the control of the control unit 119.

The weighting set unit 603 calculates the weighting factors with respect to all the vector signals in the local region using the vector signal in the target region under the control of the control unit 119 so as to be transferred to the filtering unit 114.

The filtering unit 114 performs the filtering process with respect to the vector signals from the vectorizing unit 112 with the weighting factors from the weighting set unit 603 so as to be transferred to the replacement unit 604 under the control of the control unit 119.

The replacement unit 604 transfers the filtered vector signal from the filtering unit 114 to the scalar unit 116 as the vector signal in the target region under the control of the control unit 119.

The scalar unit 116 converts the vector signal from the replacement unit 604 into the inherent color signal of the image pickup device, that is, color signals of R, G and B in the present embodiment so as to be transferred to the signal processing device 117 under the control of the control unit 119.

Each processing in the aforementioned extraction unit 111, the vectorizing unit 112, the weighting set unit 603, the filtering unit 114, the replacement unit 604 and the scalar unit 116 are to be synchronously performed for each local region.

The signal processing unit 117 performs the known tone correction process and the compression process and the like, and transfers the processed signal to the output unit 118.

The output unit 118 records the image signal transferred from the signal processing unit 117 in the recording medium such as the memory card so as to be stored therein.

Then the local region and the vectorization in a three CCD will be described referring to FIGS. 17A to 17D.

FIGS. 17A to 17C show structures of the local regions of the R, G, and B signals, respectively.

In the embodiment, the local region has the 5×5 pixels size.

Each target region of those three signals of R, G and B is formed as 1×1 pixel at the center of the local region, that is, $R_{12}$, $G_{12}$, and $B_{12}$, respectively. The neighborhood regions surround the target region so as not to be overlapped therewith, that is, in total of 24 units of 1×1 pixel.

The extraction unit 111 sequentially extracts the local regions having 4 pixels either in the x-axis or y-axis direction overlapped so as to allow the target region to cover the whole image signal.

FIG. 17D shows the arrangement of vector signals corresponding to the target and the neighborhood regions, which are generated by the vectorizing unit 112. Hereinafter, the vector signal in the target region will be designated as $V_0$, and the vector signal in the neighborhood regions will be designated as $V_i$ (i=1-24), respectively.

As described above, when the image signal is vectorized with the three-dimensional vector which contains components {R, G, B}, the vector signal $V_0$ in the target region as shown in FIG. 17D will be expressed by the following equation 16.

$$V_0 = \{v_{01}, v_{02}, v_{03}\} = \{R_{12}, G_{12}, B_{12}\} \quad \text{[Equation 16]}$$

In the embodiment, the three CCD is employed as the image pickup device. However, the present invention is not limited to the aforementioned structure. For example, the image pickup device with three pixel shift structure, two CCD and other type of the image pickup device may be employed.

The structure of the weighting set unit 603 will be described referring to FIG. 18 illustrating an exemplary structure of the weighting set unit 603.

The weighting set unit 603 includes the norm calculating unit 200, the first buffer 201, a noise estimation unit 702, the constant calculating unit 203, the norm selection unit 204, the weighting factor calculating unit 205, the second buffer 206, the distance measure calculating unit 207, an angle measure calculating unit 700, a multiplication unit 701, the third buffer 208, the average measure calculating unit 209, the deviation calculating unit 210, and the target vector weighting factor calculating unit 211.

The weighting set unit 603 shown in FIG. 18 has substantially the same structure as that of the weighting set unit 113 according to Embodiment 1 shown in FIG. 5 except for the noise estimation unit 702 which replaces the noise estimation unit 202 and the angle measure calculation unit 700 and the multiplication unit 701 added to the structure. Other structures are the same as those described above, and the same components will be designated with the same reference numerals such that only the different feature is mainly described.

The first buffer 201 is connected to the noise estimation unit 702 and the norm selection unit 204, and the noise estimation unit 702 as the noise estimation means is connected to the constant calculating unit 203 and the deviation calculating unit 210, respectively.

The vectorizing unit 112 is connected to the norm calculating unit 200, the distance measure calculating unit 207, and the angle measure calculating unit 700, respectively.

The distance measure calculating unit 207 and the angle measure calculating unit 700 are connected to the multiplication unit 701.

The multiplication unit 701 as the average measure value calculating means is connected to the third buffer 208.

The control unit 119 controls the angle measure calculating unit 700, the multiplication unit 701, and the noise estimation unit 702, which are bi-directionally connected thereto.

The feature of the operation of the weighting set unit 603, which is different from that of the weighting set unit 113 as described above will be explained hereinafter.

The noise estimation unit 702 reads the norm $\|V_0\|$ of the vector signal $V_0$ in the target region from the first buffer 201 under the control of the control unit 119 to estimate the noise amount $N_0$ of the vector signal $V_0$ in the target region based on the norm $\|V_0\|$ of the vector signal $V_0$ in the target region and the shooting information from the control unit 119. The estimated noise amount $N_0$ is transferred to the constant calculating unit 203 and the deviation calculating unit 210, respectively. The noise estimation unit 702 transfers the norm $\|V_0\|$ of the vector signal $V_0$ in the target region to the constant calculating unit 203.

The constant calculating unit 203 reads the norm $\|V_0\|$ of the vector signal $V_0$ in the target region and the noise amount $N_0$ from the noise estimation unit 702 under the control of the control unit 119 to calculate the constant term of the function used for calculating the weighting factor. In the embodiment, the second order function shown in FIG. 19 is used as the function for calculating the weighting factor. The function is intended to output the weighting factor $w_i$ with respect to the vector signal having the norm $\|V_i\|$ of the vector signal $V_i$ in the neighborhood regions inputted. The second order function shown in FIG. 19 is defined by the following equation 17.

$$w_i = \frac{\|V_0\| - N_0}{\|V_0\|^2 \cdot N_0}\|V_i\|^2 + \frac{2(N_0 - \|V_0\|)}{\|V_0\| \cdot N_0}\|V_i\| + \frac{\|V_0\|}{N_0} \quad \text{[Equation 17]}$$

The constant calculating unit 203 calculates three constant terms in the equation 17 so as to be transferred to the weighting factor calculating unit 205.

The norm selection unit 204 selects the norm $\|V_i\|$ of the vector signal Vi in the neighborhood regions from the first buffer 201 sequentially so as to be transferred to the weighting factor calculating unit 205 under the control of the control unit 119.

The weighting factor calculating unit 205 calculates the weighting factor based on the equation 17 with respect to the norm $\|V_i\|$ of the vector signal $V_i$ in the neighborhood regions to be transferred from the norm selection unit 204, and transfers the calculated weighting factor $w_i$ to the second buffer 206 under the control of the control unit 119.

Meanwhile, the angle measure calculating unit 700 as the average measure value calculating means reads the vector signal $V_0$ in the target region and the vector signal $V_i$ in the neighborhood regions from the vectorizing unit 112 to calculate an angle measure value $a(V_k, V_l)$ (k=0-24, l=0-24) between two vector signals as expressed by the following equation 18 under the control of the control unit 119.

$$a(V_k, V_l) = \cos^{-1}\frac{\sum_{j=1,3} v_{kj}v_{lj}}{\sqrt{\sum_{j=1,3}(v_{kj})^2}\sqrt{\sum_{j=1,3}(v_{lj})^2}} \quad \text{[Equation 18]}$$

The angle measure calculating unit 700 transfers the calculated angle measure value $a(V_k, V_l)$ to the multiplication unit 701.

Likewise the distance measure value, the angle measure value has symmetrical property relative to the interchange, that is, $a(V_k, V_l) = a(V_l, V_k)$, and the angle measure value calculated from the same vector signals becomes 0. It is possible to omit the calculation of the redundant angle measure values. In this case, only 300 angle measure values ((625−25)/2) may be calculated.

The distance measure calculating unit 207 calculates the distance measure value $d(V_k, V_l)$ which is the same as the one expressed by the equation 7 according to Embodiment 1, and transfers the calculated distance measure value $d(V_k, V_l)$ to the multiplication unit 701.

The multiplication unit 701 multiplies the angle measure value $a(V_k, V_l)$ from the angle measure calculating unit 700 by the distance measure value $d(V_k, V_l)$ from the distance measure calculating unit 207 based on the following equation 19 to calculate the measure value $ad(V_k, V_l)$ as the combination of those two measure values.

$$ad(V_k, V_l) = a(V_k, V_l) \cdot d(V_k, V_l) \quad \text{[Equation 19]}$$

The multiplication unit 701 transfers the calculated measure value $ad(V_k, V_l)$ to the third buffer 208 so as to be stored therein.

The subsequent process steps are the same as those executed by the weighting set unit 113 according to Embodiment 1 shown in FIG. 5.

The structure of the noise estimation unit 702 will be described referring to FIG. 20 illustrating the exemplary structure thereof.

The noise estimation unit 702 includes the gain calculating unit 300, the standard value assigning unit 301, and a look-up table 800.

The noise estimation unit 702 has basically the same structure as that of the noise estimation unit 202 according to Embodiment 1 shown in FIG. 8 except that the look-up table 800 as the noise amount calculating means and the look-up table means are added, and the parameter ROM 302, the parameter selection unit 303, the interpolation unit 304 and the correction unit 305 are omitted from the structure. As other structures are the same as those as described above, the same components will be designated with the same reference numerals such that only the different feature will be mainly described.

The first buffer 201, the gain calculating unit 300, and the standard value assigning unit 301 are connected to the look-up table 800, respectively.

The look-up table 800 is connected to the constant calculating unit 203 and the deviation calculating unit 210, respectively.

The control unit 119 controls the look-up table 800 which is bi-directionally connected thereto.

The feature of the function of the noise estimation unit 702, which is different from that of the noise estimation unit 202 will be described hereinafter.

The look-up table 800 reads the norm $\|V_0\|$ of the vector signal $V_0$ in the target region from the first buffer 201 under the control of the control unit 119.

The gain calculating unit 300 as the collection means and the gain calculating means obtains the amplification amount of the amplifier 104 based on at least one of the ISO sensitivity transferred from the control unit 119, information (exposure information) on the exposure condition, and the white balance information, and transfers the obtained amplification amount of the amplifier 104 to the look-up table 800.

The control unit 119 obtains the temperature information of the G_CCD 601 from the temperature sensor 103, and transfers the obtained temperature information to the look-up table 800.

The look-up table 800 outputs the noise amount $N_0$ of the vector signal $V_0$ in the target region based on the norm $\|V_0\|$ of the vector signal $V_0$ in the target region from the first buffer 201, the gain information from the gain calculating unit 300, and the temperature information from the control unit 119.

The look-up table 800 stores the relation between the norm of the vector signal, the gain with respect to the image signal, the image pickup device temperature, and the noise amount of the vector signal, and is structured based on the equation 11 according to Embodiment 1.

The noise amount derived from the look-up table 800 is transferred to the constant calculating unit 203 and the deviation calculating unit 210, respectively.

The measure value is formed by combining two values, that is, the angle measure value $a(V_k, V_l)$ and the distance measure value $d(V_k, V_l)$. However, it is not limited to the aforementioned structure. For example, only the angle measure value $a(V_k, V_l)$ or the distance measure value $d(V_k, V_l)$ may be used for the structure. Those two values may be combined in the arbitrary manner besides the multiplication.

Likewise the structure of Embodiment 1 shown in FIG. 13, the image signal picked up by the separately formed image pickup portion and recorded in the recording medium such as the memory card may be read therefrom so as to be processed.

In the aforementioned embodiment, the hardware is assumed to be used for the processing. However, it is not limited to the aforementioned structure. For example, the image signals from the R_CCD 600, G_CCD 601 and B_CCD 602 may be recorded in the recording medium such as the memory card as unprocessed (Raw) data, and the accompanying data such as the shooting condition from the control unit 119 may be recorded in the recording medium as the header information. Then the image processing program as the software is executed by the computer to read the information in the recording medium for the processing. Various types of information from the image pickup portion to the computer may be transferred not only through the recording medium but also through the communication line.

Referring to FIG. 21, the main routine of the image processing program will be described. The process substantially the same as the one in Embodiment 1 shown in FIG. 14 will be designated with the same step number.

Upon start of the process, the image signal is read and the header information such as the gain is read (step S1).

The local regions each with 5×5 pixels size including the target and neighborhood regions as shown in FIGS. 17A to 17C are sequentially extracted (step S2).

Then 25 vector signals as shown in FIG. 17D are obtained (step S3).

The norm of the vector signal is calculated using the equation 4 (step S4).

The noise amount of the vector signal in the target region is estimated to be described later referring to FIG. 22 (step S30).

The constant terms used for the second order function shown in the equation 17 are calculated using the calculated norm of the vector signal and the estimated noise amount (step S6).

The weighting factor of the vector signal $V_i$ in the neighborhood regions using the second order function shown in the equation 17 with the constant term set is calculated.

The angle measure value shown in the equation 18 and the distance measure value shown in the equation 7 are calculated using the vector signals obtained in step S3 (step S31).

The measure value is calculated by combining two measure values as shown in the equation 19 (step S32).

The average measure value is calculated using the measure values of the target vector (step S9).

The deviation is calculated based on the average measure value derived from step S9 and the noise amount of the target vector estimated in step S30 (step S10).

The weighting factor of the vector signal $V_0$ in the target region is calculated using the equation 9 (step S11).

The total value of the weighted measure values is calculated using the weighting factor of the vector signal $V_i$ in the neighborhood regions calculated in step S7 and the weighting factor of the vector signal $V_0$ in the target region calculated in step S11 (step S12).

The minimum value is searched from the calculated total values of the weighted measure values (step S13), and the vector signal corresponding to the total value of the thus searched minimum weighted measure value is selected (step S14).

The vector signal obtained in step S14 is set as the vector signal of the target vector (replaced) to obtain the noise reduced vector signal (step S33).

It is determined whether the processing for all the local regions has been completed (step S16). If No is obtained, the process returns to step S2 where the aforementioned processing with respect to the next local region will be executed repeatedly.

If it is determined that the processing for all the local regions has been completed, the known signal processing such as the tone correction and the compression (step S17) are performed, and outputs the processed signal (step S18) to end the process.

The process for estimating the noise amount in step S30 shown in FIG. 21 will be described.

Upon start of the process in step S30 shown in FIG. 21, the noise relevant information such as temperature, gain and the like, are set from the read header information (step S20). If the header information does not contain the required parameter, the predetermined standard value is assigned.

The noise amount is obtained using the look-up table based on the respective parameters obtained in step S20 (step S40).

Then the calculated noise amount is outputted (step S25), and the process returns to the main routine shown in FIG. 21.

In Embodiment 2, the image signal is vectorized to estimate the noise amount in the vector space. The weighting factors of each vector signals are set based on the estimated noise amount. The filtering process is then executed using the set weighting factors. The noise reducing process is enabled based on the filtering result. Likewise Embodiment 1, the noise reduction with respect to the entire noise may be performed with high accuracy while suppressing such adverse effects as deterioration in the edge regions and the change in the hue.

As the noise amount is calculated using the look-up table, the high speed processing may be performed.

The second order function is set for calculating the weighting factor. Then the weighting factor may be sequentially generated to execute the noise reducing process with higher accuracy.

The distance measure value and the angle measure value are combined to form the measure value between two vector signals. This makes it possible to improve the accuracy in the noise reducing process for the luminance noise and color noise.

The vector signal derived from the filtering process is set as the output signal. This makes it possible to structure the system capable of performing the high speed process while reducing the cost.

The present invention is not limited to the aforementioned embodiments, but may be changed and modified to various forms without departing from the scope of the present invention.

[Additional Statements]

The aforementioned embodiments according to the present invention provide the following structures.

[Addition 1]

Addition 1 provides an image processing system which performs noise reducing process with respect to an image signal formed of a plurality of color signals from an image pickup device. The image processing system includes:

extraction means for extracting a local region which contains a target region to be subjected to the noise reducing process, and at least one or more neighborhood regions which exist neighborhood of the target region from the image signal;

vectorizing means for obtaining vector signals which contain the plurality of color signals as components for each of the target and the neighborhood regions;

set means for setting weighting factors with respect to each of the vector signals in the local region based on the vector signal in the target region;

filtering means for performing a filtering process using the weighting factors with respect to the vector signals in the local region; and noise reducing means for reducing a noise of the vector signal in the target region based on the vector signal through the filtering process.

Corresponding Embodiment and Preferred Example

The addition corresponds to Embodiments 1 and 2. The extraction means corresponds to the extraction unit 111 shown in FIGS. 1, 13 and 16. The vectorizing means corresponds to the vectorizing unit 112 shown in FIGS. 1, 13 and 16. The set means corresponds to the weighting set unit 113 shown in FIGS. 1, 5 and 13, and the weighting set unit 603 shown in FIGS. 16 and 18. The filtering means corresponds to the filtering unit 114 shown in FIGS. 1, 12, 13 and 16. The noise reducing means corresponds to the noise reducing unit 115 shown in FIGS. 1 and 13, and the replacement unit 604 shown in FIG. 16.

In the image processing system as a preferred example according to the present invention, the local region including the target region subjected to the noise reducing process performed by the extraction unit 111, and at least one of the neighborhood regions adjacent to the target region is extracted. The vector signal which contains all-color signal as the component is derived from the vectorizing unit 112. The weighting factor with respect to the respective vector signals in the local region is set by the weighting set unit 113 or 603 based on the vector signal in the target region. The filtering process using the weighting factor is performed by the filtering unit 114. The noise of the vector signal in the target region is reduced by the noise reducing unit 115 or the replacement unit 604 based on the vector signal derived from the filtering process.

[Function]

The image signal is vectorized to estimate the noise amount in the vector space. Based on the estimated noise amount, the weighting factors with respect to the respective vector signals are set. The filtering process is performed using the set weighting factors. The noise reducing process is further performed based on the filtering results.

[Effect]

The adverse effect such as deterioration in the edge regions and the change in the hue may be suppressed, and the entire noise may be reduced with high accuracy. As the parameter setting is not required, the high speed processing may be automatically performed.

[Addition 2]

In the image processing system of Addition 2 according to Addition 1, the set means includes:

norm calculating means for calculating a norm of each of the vector signals in the local region;

noise estimation means for estimating a noise amount with respect to the vector signal in the target region based on the norm of the vector signal in the target region;

constant calculating means for calculating a constant term of a function for calculating the weighting factors based on the noise amount; and weighting factor calculating means for calculating the weighting factors of each of the vector signals in the local region based on the norm of each of the vector signals in the local region and the function setting the constant term.

Corresponding Embodiment and Preferred Example

The addition corresponds to Embodiments 1 and 2. The norm calculating means corresponds to the norm calculating unit 200 shown in FIGS. 5 and 18. The noise estimation means corresponds to the noise estimation unit 202 shown in FIGS. 5 and 8, and the noise estimation unit 702 shown in FIGS. 18 and 20. The constant calculating means corresponds to the constant calculating unit 203 shown in FIGS. 5 and 18. The weighting factor calculating means corresponds to the weighting factor calculating unit 205 shown in FIGS. 5 and 18.

In the image processing system as the preferred example according to the present invention, the norm calculating unit 200 calculates each norm of the respective vector signals. The noise estimation unit 202 or 702 estimates the noise amount with respect to the vector signal in the target region. The constant calculating unit 203 calculates the constant term of the factor used for calculating the weighting factor based on the noise amount. The weighting factor calculating unit 205 calculates the weighting factors with respect to the respective vector signals in the local region based on each norm of the vector signals and the function setting the constant term.

[Function]

The noise amount of the vector signal is dynamically estimated to calculate the weighting factors for filtering with respect to the respective vector signals based on the estimated noise amount.

[Effect]

The amount of the generated noise may be appropriately followed to perform the filtering process using the optimum weighting factor. This makes it possible to perform the noise reducing process with high accuracy.

[Addition 3]

In the image processing system of Addition 3 according to Addition 2, the noise estimation means includes:

collection means for collecting information data with respect to a temperature value of the image pickup device and a gain value with respect to the image signal;

assigning means for assigning a standard value for the information data which are not supplied from the collection means; and noise amount calculating means for calculating the amount of the noise with respect to the vector signal based on the information data from the collection means or the assigning means, and the norm of the vector signal in the target region.

Corresponding Embodiment and Preferred Example

The addition corresponds to Embodiments 1 and 2. The collection means corresponds to the temperature sensor 103 and the control unit 119 shown in FIGS. 1 and 16, and the gain calculating unit 300 shown in FIGS. 8 and 20. The assigning means corresponds to the standard value assigning unit 301 shown in FIGS. 8 and 20. The noise amount calculating means corresponds to the parameter ROM 302, the parameter selection unit 303, the interpolation unit 304, the correction unit 305 shown in FIG. 8, and the look-up table 800 shown in FIG. 20.

In the image processing system as the preferred example according to the present invention, the temperature sensor 103, the control unit 119 and the gain calculating unit 300 collect the information used for estimating the noise amount. The standard value assigning unit 301 sets the standard value when the information from the temperature sensor 103, the control unit 119 and the gain calculating unit 300 cannot be supplied. The noise amount is obtained by the parameter ROM 302, the parameter selection unit 303, the interpolation unit 304, the correction unit 305 or the look-up table 800.
[Function]
Various types of information data with respect to the noise amount are dynamically obtained for each shooting operation, and the standard value is set with respect to the information which cannot be supplied. The noise amount is then calculated based on the aforementioned information.
[Effect]
The noise amount may be estimated with high accuracy by dynamically conforming to the different condition for each shooting. When the required information cannot be supplied, the noise amount may be estimated, resulting in the stable noise reducing effect.
[Addition 4]
In the image processing system of Addition 4 according to Addition 3, the collection means includes a temperature sensor which measures a temperature of the image pickup device.

Corresponding Embodiment and Preferred Example

The addition corresponds to Embodiments 1 and 2. The temperature sensor corresponds to the temperature sensor 103 shown in FIGS. 1 and 16.

The image processing system as the preferred example according to the present invention is structured to allow the temperature sensor 103 to measure the temperature of the image pickup device real-time.
[Function]
The temperature of the image pickup device for each shooting operation is measured so as to be used as the information for estimating the noise amount.
[Effect]
The noise amount may be estimated with high accuracy by dynamically conforming to the change in the temperature of the image pickup device for each shooting operation.
[Addition 5]
In the image processing system of Addition 5 according to Addition 3, the collection means includes gain calculating means for calculating the gain value based on at least one or more pieces of information of an ISO sensitivity, an exposure information and a white balance information.

Corresponding Embodiment and Preferred Example

The addition corresponds to Embodiments 1 and 2. The gain calculating means corresponds to the gain calculating unit 300 and the control unit 119 shown in FIGS. 8 and 20.

The image processing system as the preferred example according to the present invention is structured to allow the control unit 119 to transfer the ISO sensitivity, the exposure information, and the white balance information such that the gain calculating unit 300 obtains the total gain for each shooting operation.
[Function]
The gain amount for each shooting operation is obtained based on at least one of information data including the ISO sensitivity, the exposure information, and the white balance information as the information for estimating the noise amount.
[Effect]
The noise amount may be estimated with high accuracy by dynamically conforming to the change in the gain for each shooting operation.
[Addition 6]
In the image processing system of Addition 6 according to Addition 3, the noise amount calculating means includes:
recording means which records groups of parameters including a parameter of reference noise model, and a parameter of correction coefficient with respect to the reference noise model;
parameter selection means which selects the required parameters from the groups of the parameters based on information data from the collection means or the assigning means, and the norm of the vector signal in the target region;
reference noise amount calculating means which calculates the reference noise amount based on the norm of the vector signal in the target region, and the parameter of reference noise model selected by the parameter selection means; and
reference noise amount correction means which obtains the noise amount by correcting the reference noise amount based on the parameter of correction coefficient selected by the parameter selection means.

Corresponding Embodiment and Preferred Example

The addition corresponds to Embodiment 1. The parameter selection means corresponds to the parameter ROM 302 shown in FIG. 8, and the parameter selection unit 303 shown in FIG. 8. The reference noise amount calculating means corresponds to the interpolation unit 304 shown in FIG. 8. The reference noise amount correction means corresponds to the correction unit 305 shown in FIG. 8, respectively.

In the image processing system as the preferred example according to the present invention, the factor and the correction coefficient of the reference noise model for estimating the noise amount preliminarily measured in the parameter ROM 302 are recorded. The parameter selection unit 303 selects the factor and the correction coefficient of the reference noise model, and the interpolation unit 304 calculates the reference noise amount based on the reference noise model. The correction unit 305 performs the correction based on the correction coefficient to obtain the noise amount.
[Function]
The correction process is performed based on the reference noise model to obtain the noise amount.

[Effect]

The model is used for calculating the noise amount such that the noise amount may be estimated with high accuracy. The process for calculating the noise amount with the reference noise model realizes the system easily mounted at low costs.

[Addition 7]

In the image processing system of Addition 7 according to Addition 6, the reference noise model includes a plurality of coordinate point data constructed of the noise amount as to the norm of the vector signal.

Corresponding Embodiment and Preferred Example

The addition corresponds to Embodiment 1.

The image processing system as the preferred example according to the present invention employs the reference noise model which contains a plurality of coordinate data as shown in FIG. 10.

[Function]

The reference noise model is configured using a plurality of coordinate data.

[Effect]

As the memory size required for configuring the model is small, the cost may be reduced.

[Addition 8]

In the image processing system of Addition 8 according to Addition 3, the noise amount calculating means includes look-up table means which provides the noise amount by inputting the information from the collection means or the assigning means, and the norm of the vector signal in the target region.

Corresponding Embodiment and Preferred Example

The addition corresponds to Embodiment 2. The look-up table means corresponds to the look-up table 800 shown in FIG. 20.

The image processing system as the preferred example according to the present invention obtains the noise amount in reference to the look-up table 800.

[Function]

The noise amount is obtained in reference to the look-up table means.

[Effect]

As the look-up table means is used for obtaining the noise amount, the high speed process may be performed.

[Addition 9]

In the image processing system of Addition 9 according to Addition 2, the constant calculating means calculates a constant term of the function with respect to a combination of a plurality of linear functions or a constant term of the function with respect to a second order function.

Corresponding Embodiment and Preferred Example

The addition corresponds to Embodiments 1 and 2.

The image processing system as the preferred example according to the present invention calculates the constant term with respect to combination of a plurality of linear functions as shown in FIG. 6, or the constant term with respect to the second order function as shown in FIG. 19.

[Function]

The combination of a plurality of the linear functions, or the second order function is set as the function for calculating the weighting factor so as to calculate the constant term for the set function.

[Effect]

When the combined plural linear functions are used, the calculation of the constant term is simply performed to increase the processing speed and to reduce the cost. When the second order function is used, the weighting factors may be sequentially generated to allow the noise reducing process with higher accuracy.

[Addition 10]

In the image processing system of Addition 10 according to Addition 2, the weighting factor calculating means includes:

average measure value calculating means which calculates an average of measure values between the vector signal in the target region and each of the vector signals in the neighborhood regions;

deviation calculating means which calculates a deviation with respect to the vector signal in the target region based on the average of the measure value and the noise amount of the vector signal in the target region; and target vector weighting factor calculating means which calculates the weighting factor of the vector signal in the target region based on the deviation.

Corresponding Embodiment and Preferred Example

The addition corresponds to Embodiments 1 and 2. The average measure calculating means corresponds to the distance measure calculating unit 207, the average measure calculating unit 209 shown in FIGS. 5 and 18, the angle measure calculating unit 700 and the multiplication unit 701 shown in FIG. 18. The deviation calculating means corresponds to the deviation calculating unit 210 shown in FIGS. 5 and 18. The target vector weighting factor calculating means corresponds to the target vector weighting factor calculating unit 211 shown in FIGS. 5 and 18.

In the image processing system as the preferred example according to the present invention, the average of the measure values is calculated by the distance measure calculating unit 207, the average measure calculating unit 209 (the angle measure calculating unit 700 and the multiplication unit 701 if needed). The deviation calculating unit 210 calculates the deviation with respect to the vector signal in the target region from the average of the measure values and the noise amount with respect to the vector signal in the target region. The target vector weighting factor calculating unit 211 calculates the weighting factor with respect to the vector signal in the target region.

[Function]

Based on the deviation of vector signal in the target region from the other vector signal, the weighting factor with respect to the vector signal in the target region is calculated independently from the calculation of the weighting factor with respect to the vector signal in the neighborhood regions.

[Effect]

The accuracy in the filtering process with respect to the spike noise is improved, thus allowing the noise reducing processing with high accuracy.

[Addition 11]

In the image processing system of Addition 11 according to Addition 1, the filtering means includes:

weighting measure value calculating means which calculates a total value obtained by multiplying the measure value between the vector signal and the other vector signal by the weighting factor for each of the vector signals in the local region;

search means which searches a minimum value from the total value of the measure value of each of the vector signals in the local region; and output means which outputs the vector signal corresponding to the total value of the minimum measure value.

Corresponding Embodiment and Preferred Example

The addition corresponds to Embodiment 1. The weighting measure value calculating means corresponds to the weighting measure value calculating unit 402 shown in FIG. 12. The search means corresponds to the minimum measure search unit 404 shown in FIG. 12. The output means corresponds to the corresponding vector selection unit 405 shown in FIG. 12.

In the image processing system as the preferred example according to the present invention, the weighting measure value calculating unit 402 calculates the total value obtained by multiplying the measure value between the vector signal and the other vector signal by the weighting factor in the local region. The minimum measure search unit 404 searches the minimum value from the total measure values. The corresponding vector selection unit 405 outputs the vector signal corresponding to the total value of the minimum measure values.

[Function]

The vector signal corresponding to the minimum total value of the weighted measure values is output.

[Effect]

The adverse effect such as deterioration in the edge regions is suppressed, and the process for reducing the entire noise with high accuracy is realized.

[Addition 12]

In the image processing system of Addition 12 according to Addition 10 or 11, the measure value is a distance measure value $d(V_i, V_j)$ defined by a following equation with respect to two n-dimensional vector signals $V_i=\{v_{i1}, v_{i2}, \ldots, v_{in}\}$ and $V_j=\{v_{j1}, v_{j2}, \ldots, v_{jn}\}$.

$$d(V_i, V_j) = \sqrt{\sum_{k=1,n} (v_{ik} - v_{jk})^2}$$

Corresponding Embodiment and Preferred Example

The addition corresponds to Embodiment 1.

The image processing system as the preferred example according to the present invention uses the distance measure value calculated by the distance measure calculating unit 207 shown in FIG. 5 as the measure value.

[Function]

The distance measure value is used as the measure value between the two vector signals.

[Effect]

As the distance measure value is highly correlated with the luminance noise, the accuracy of the processing for reducing the luminance noise may be improved.

[Addition 13]

In the image processing system of Addition 13 according to Addition 10 or 11, the measure value is an angle measure value $a(V_i, V_j)$ defined by a following equation with respect to two n-dimensional vector signals $V_i=\{v_{i1}, v_{i2}, \ldots, v_{in}\}$ and $V_j=\{v_{j1}, v_{j2}, \ldots, v_{jn}\}$.

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}$$

Corresponding Embodiment and Preferred Example

The addition corresponds to Embodiment 2.

The image processing system as preferred example according to the present invention uses the angle measure value calculated by the angle measure value calculating unit 700 shown in FIG. 18 as the measure value.

[Function]

The angle measure value is used as the measure value between the two vector signals.

[Effect]

As the angle measure value is highly correlated with the color noise, the accuracy of the processing for reducing the color noise may be improved.

[Addition 14]

In the image processing system of Addition 14 according to Addition 10 or 11, the measure value is obtained by combining a distance measure value $d(V_i, V_j)$ and an angle measure value $a(V_i, V_j)$ defined by following equations with respect to two n-dimensional vector signals $V_i=\{v_{i1}, v_{i1}, \ldots, v_{in}\}$ and $V_j=\{v_{j1}, v_{j2}, \ldots, v_{jn}\}$.

$$d(V_i, V_j) = \sqrt{\sum_{k=1,n} (v_{ik} - v_{jk})^2}$$

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}$$

Corresponding Embodiment and Preferred Example

The addition corresponds to Embodiment 2.

In the image processing system as the preferred example, the distance measure value calculated by the distance measure value calculating unit 207 shown in FIG. 18 and the angle measure value calculated by the angle measure value calculating unit 700 shown in FIG. 18 are combined by the multiplication unit 701 shown in FIG. 18 so as to be used as the measure value.

[Function]

The distance measure value and the angle measure value are combined to generate the measure value between two vector signals.

[Effect]

As the distance measure value is highly correlated with the luminance noise, and the angle measure value is highly correlated with the color noise, both values are combined to improve the accuracy of the noise reducing process with respect to both the luminance noise and the color noise.

[Addition 15]

In the image processing system of Addition 15 according to Addition 1, the noise reducing means includes averaging means which sets a vector signal obtained by subjecting the vector signal through the filtering process and the vector signal in the target region to the weighted averaging process using a predetermined weighting factor to the vector signal in the target region.

Corresponding Embodiment and Preferred Example

The addition corresponds to Embodiment 1. The averaging means corresponds to the noise reducing unit 115 shown in FIGS. 1 and 13.

In the image processing system as the preferred example according to the present invention, the noise reducing unit 115 performs the weighted averaging of the vector signal derived from the filtering process and the vector signal in the target region using the predetermined weighting factor. The obtained vector signal is set as the one in the target region.

[Function]

The vector signal derived from the filtering process and the inherent vector signal are subjected to the weighted averaging process.

[Effect]

Generation of the false contour may be suppressed, thus performing the subjectively preferable noise reducing process.

[Addition 16]

In the image processing system of Addition 16 according to Addition 1, the noise reducing means includes replacement means which sets the vector signal through the filtering process to the vector signal in the target region.

Corresponding Embodiment and Preferred Example

The addition corresponds to Embodiment 2. The replacement means corresponds to the replacement unit 604 shown in FIG. 16.

The image processing system as the preferred example according to the present invention sets the vector signal derived from the filtering process to the one in the target region.

[Function]

The vector signal derived from the filtering process is set as the output signal.

[Effect]

The processing system may be simplified to form the system capable of performing the high speed process at low costs.

[Addition 17]

In the image processing system of Addition 17 according to Addition 1, the image pickup device is a single image pickup device in front of which is arranged an R, G, B Bayer-type primary color filter or a single image pickup device in front of which is arranged a Cy, Mg Ye, G color-difference line-sequential type complementary color filter.

Corresponding Embodiment and Preferred Example

The addition corresponds to Embodiment 1.

The image processing system as the preferred example according to the present invention employs a single CCD having the Bayer-type primary color filter shown in FIG. 2A or 3A or the color-difference line-sequential type complementary color filter shown in FIG. 4A disposed on the front surface.

[Function]

The single CCD having the Bayer-type primary color filter or the color difference line-sequential type complementary color filter disposed on the front surface is employed.

[Effect]

The system is highly compatible with the generally employed shooting portion, which may be applied to various types of the image processing system.

[Addition 18]

The image processing system of Addition 18 according to Addition 1 further includes scalar means which obtains the plurality of color signals from the noise reduced vector signal by the noise reducing means.

Corresponding Embodiment and Preferred Example

The addition corresponds to Embodiments 1 and 2. The scalar means corresponds to the scalar unit 116 shown in FIGS. 1, 13 and 16.

The image processing system as the preferred example according to the present invention allows the scalar unit 116 to return the noise reduced vector signal to the inherent color signal of the image pickup device.

[Function]

The noise reduced vector signal is returned to the inherent color signal of the image pickup device.

[Effect]

As the vector signal is returned to the inherent color signal of the image pickup device after the noise reducing process, the compatibility with the subsequent process system may be maintained, allowing various systems to be combined.

[Addition 19]

Addition 19 provides an image processing program which allows a computer to execute noise reducing process with respect to an image signal formed of a plurality of color signals from an image pickup device. The image processing program configured to be executed by the computer includes:

an extraction step for extracting a local region including a target region to be subjected to a noise reduction process and at least one or more neighborhood regions which exist neighborhood of the target region from the image signal;

a vectorizing step for obtaining vector signals which contain the plurality of color signals as components for each of the target and the neighborhood regions;

a set step for setting weighting factors with respect to each of the vector signals in the local region based on the vector signals in the target region;

a filtering step for filtering the vector signal in the local region using the weighting factors; and a noise reducing step for reducing a noise of the vector signal in the target region based on the vector signal through the filtering step.

Corresponding Embodiment and Preferred Example

The addition is substantially the same as Addition 1. The respective steps correspond to those shown in FIGS. 14 and 15, or FIGS. 21 and 22.

[Addition 20]

In the image processing program of Addition 20 according to Addition 19, the set step includes:

a norm calculating step for calculating a norm of each of the vector signals in the local region;

a noise estimation step for estimating a noise amount with respect to the vector signal in the target region based on the norm of the vector signal in the target region;

a constant calculating step for calculating a constant term of a function for calculating a weighting factor based on the noise amount; and a weighting factor calculating step for calculating the weighting factor of each of the vector signals in the local region based on the norm of each of the vector signals in the local region and the function setting the constant term.

Corresponding Embodiment and Preferred Example

The addition is substantially the same as Addition 2. The respective steps correspond to those shown in FIGS. 14 and 15, or FIGS. 21 and 22.

[Addition 21]

In the image processing program of Addition 21 according to Addition 20, the noise estimation step includes:

a collection step for collecting information data with respect to a temperature value of the image pickup device and a gain value of the image signal;

an assigning step for assigning a standard value with respect to the information data which are not supplied from the collection step; and a noise amount calculating step for calculating a noise amount with respect to the vector signal based on the information data supplied from the collection step or the assigning step, and the norm of the vector signal in the target region.

Corresponding Embodiment and Preferred Example

The addition is substantially the same as Addition 3. The respective steps correspond to those shown in FIGS. 14 and 15, or FIGS. 21 and 22.

[Addition 22]

In the image processing program of Addition 22 according to Addition 20, the constant calculating step calculates a constant term of the function with respect to a combination of a plurality of linear functions or a constant term of the function with respect to a second order function.

Corresponding Embodiment and Preferred Example

The addition is substantially the same as Addition 9. The respective steps correspond to those shown in FIGS. 14 and 15, or FIGS. 21 and 22.

[Addition 23]

In the image processing program of Addition 23 according to Addition 20, the weighting factor calculating step includes:

an average measure value calculating step for calculating an average of the measure values between the vector signal in the target region and each of the vector signals in the neighborhood regions;

a deviation calculating step for calculating a deviation with respect to the vector signal in the target region based on the average of the measure values and the noise amount of the vector signal in the target region; and a target vector weighting factor calculating step for calculating the weighting factor of the vector signal in the target region based on the deviation.

Corresponding Embodiment and Preferred Example

The addition is substantially the same as Addition 10. The respective steps correspond to those shown in FIGS. 14 and 15, or FIGS. 21 and 22.

[Addition 24]

In the image processing program of Addition 24 according to Addition 19, the filtering step includes:

a weighted measure value calculating step for calculating a total value obtained by multiplying the measure value between the vector signal and other vector signal by the weighting factor for each of the vector signals in the local region;

a search step for searching a minimum value from the total value of the measure value with respect to each of the vector signals in the local region; and an output step for outputting the vector signal corresponding to the total value of the minimum measure value.

Corresponding Embodiment and Preferred Example

The addition is substantially the same as Addition 11. The respective steps correspond to those shown in FIGS. 14 and 15, or FIGS. 21 and 22.

[Addition 25]

In the image processing program of Addition 25 according to Addition 19, the noise reducing step includes an averaging step for setting the vector signal obtained by subjecting the vector signal through the filtering process and the vector signal in the target region to a weighted averaging process using the predetermined weighting factor as the vector signal in the target region.

Corresponding Embodiment and Preferred Example

The addition is substantially the same as Addition 15. The respective steps correspond to those shown in FIGS. 14 and 15.

[Addition 26]

In the image processing program of Addition 26 according to Addition 19, the noise reducing step includes a replacement step for setting the vector signal through the filtering process to the vector signal in the target region.

Corresponding Embodiment and Preferred Example

The addition is substantially the same as Addition 16. The respective steps correspond to those shown in FIGS. 21 and 22.

[Addition 27]

The image processing program of Addition 27 according to Addition 19 further includes a scalar step which obtains the plurality of color signals from the noise reduced vector signals by the noise reducing step.

Corresponding Embodiment and Preferred Example

The addition is substantially the same as Addition 18. The respective steps correspond to those shown in FIGS. 14 and 15, or FIGS. 21 and 22.

It is to be understood that the present invention is not limited to the aforementioned embodiments, but may be changed or modified into various forms without departing from the scope of the present invention.

What is claimed is:

1. An image processing system which performs noise reducing process with respect to an image signal formed of a plurality of color signals from an image pickup device, comprising:

extraction means for extracting a local region which contains a target region to be subjected to the noise reducing process, and at least one or more neighborhood regions which exist neighborhood of the target region from the image signal;

vectorizing means for obtaining vector signals which contain the plurality of color signals as components for each of the target and the neighborhood regions;

set means for setting weighting factors with respect to each of the vector signals in the local region based on the vector signal in the target region;

filtering means for performing a filtering process using the weighting factors with respect to the vector signals in the local region; and noise reducing means for reducing a noise of the vector signal in the target region based on the vector signal through the filtering process.

2. The image processing system according to claim 1, wherein the set means includes:

norm calculating means for calculating a norm of each of the vector signals in the local region;

noise estimation means for estimating a noise amount with respect to the vector signal in the target region based on the norm of the vector signal in the target region;

constant calculating means for calculating a constant term of a function for calculating the weighting factors based on the noise amount; and weighting factor calculating means for calculating the weighting factors of each of the vector signals in the local region based on the norm of each of the vector signals in the local region and the function setting the constant term.

3. The image processing system according to claim 2, wherein the noise estimation means includes:

collection means for collecting information data with respect to a temperature value of the image pickup device and a gain value with respect to the image signal;

assigning means for assigning a standard value for the information data which are not supplied from the collection means; and noise amount calculating means for calculating the noise amount with respect to the vector signal based on the information data from the collection means or the assigning means, and the norm of the vector signal in the target region.

4. The image processing system according to claim 3, wherein the collection means includes a temperature sensor which measures a temperature of the image pickup device.

5. The image processing system according to claim 3, wherein the collection means includes gain calculating means for calculating the gain value based on at least one or more pieces of information of an ISO sensitivity, an exposure information and a white balance information.

6. The image processing system according to claim 3, wherein the noise amount calculating means includes:

recording means which records groups of parameters including a parameter of reference noise model, and a parameter of correction coefficient with respect to the reference noise model;

parameter selection means which selects the required parameters from the groups of the parameters based on information data from the collection means or the assigning means, and the norm of the vector signal in the target region;

reference noise amount calculating means which calculates the reference noise amount based on the norm of the vector signal in the target region, and the parameter of reference noise model selected by the parameter selection means; and reference noise amount correction means which obtains the noise amount by correcting the reference noise amount based on the parameter of correction coefficient selected by the parameter selection means.

7. The image processing system according to claim 6, wherein the reference noise model includes a plurality of coordinate point data constructed of the noise amount as to the norm of the vector signal.

8. The image processing system according to claim 3, wherein the noise amount calculating means includes look-up table means which provides the noise amount by inputting the information from the collection means or the assigning means, and the norm of the vector signal in the target region.

9. The image processing system according to claim 2, wherein the constant calculating means calculates a constant term with respect to a combination of a plurality of linear functions as the function or a constant term with respect to a second order function as the function.

10. The image processing system according to claim 2, wherein the weighting factor calculating means includes:

average measure value calculating means which calculates an average of measure values between the vector signal in the target region and each of the vector signals in the neighborhood regions;

deviation calculating means which calculates a deviation with respect to the vector signal in the target region based on the average of the measure value and the noise amount of the vector signal in the target region; and target vector weighting factor calculating means which calculates the weighting factor of the vector signal in the target region based on the deviation.

11. The image processing system according to claim 1, wherein the filtering means includes:

weighting measure value calculating means which calculates a total value obtained by multiplying the measure value between the vector signal and other vector signal by the weighting factor for each of the vector signals in the local region;

search means which searches a minimum value from the total value of the measure value of each of the vector signals in the local region; and output means which outputs the vector signal corresponding to the total value of the minimum measure value.

12. The image processing system according to claim 10, wherein the measure value is a distance measure value $d(V_i, V_j)$ defined by a following equation with respect to two n-dimensional vector signals $V_i=\{v_{i1}, v_{i2}, \ldots, v_{in}\}$ and $V_j=\{v_{j1}, v_{j2}, \ldots, v_{jn}\}$.

$$d(V_i, V_j) = \sqrt{\sum_{k=1,n} (v_{ik} - v_{jk})^2}.$$

13. The image processing system according to claim 11, wherein the measure value is a distance measure value $d(V_i, V_j)$ defined by a following equation with respect to two n-dimensional vector signals $V_i=\{v_{i1}, v_{i2}, \ldots, v_{in}\}$ and $V_j=\{v_{j1}, v_{j2}, \ldots, v_{jn}\}$.

$$d(V_i, V_j) = \sqrt{\sum_{k=1,n} (v_{ik} - v_{jk})^2}.$$

14. The image processing system according to claim 10, wherein the measure value is an angle measure value $a(V_i, V_j)$ defined by a following equation with respect to two n-dimensional vector signals $V_i=\{v_{i1}, v_{i2}, \ldots, v_{in}\}$ and $V_j=\{v_{j1}, v_{j2}, \ldots, v_{jn}\}$.

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}.$$

15. The image processing system according to claim 11, wherein the measure value is an angle measure value $a(V_i, V_j)$ defined by a following equation with respect to two n-dimensional vector signals $V_i = \{v_{i1}, v_{i2}, \ldots, v_{in}\}$ and $V_j = \{v_{j1}, v_{j2}, \ldots, v_{jn}\}$.

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}.$$

16. The image processing system according to claim 10, wherein the measure value is obtained by combining a distance measure value $d(V_i, V_j)$ and an angle measure value $a(V_i, V_j)$ defined by following equations with respect to two n-dimensional vector signals $V_i = \{v_{i1}, v_{i1}, \ldots, v_{in}\}$ and $V_j = \{V_{j1}, V_{j2}, \ldots, V_{jn}\}$.

$$d(V_i, V_j) = \sqrt{\sum_{k=1,n} (v_{ik} - v_{jk})^2}$$

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}.$$

17. The image processing system according to claim 11, wherein the measure value is obtained by combining a distance measure value $d(V_i, V_j)$ and an angle measure value $a(V_i, V_j)$ defined by following equations with respect to two n-dimensional vector signals $V_i = \{v_{i1}, v_{i1}, \ldots, v_{in}\}$ and $V_j = \{v_{j1}, v_{j2}, \ldots, v_{jn}\}$.

$$d(V_i, V_j) = \sqrt{\sum_{k=1,n} (v_{ik} - v_{jk})^2}$$

$$a(V_i, V_j) = \cos^{-1} \frac{\sum_{k=1,n} v_{ik} v_{jk}}{\sqrt{\sum_{k=1,n} (v_{ik})^2} \sqrt{\sum_{k=1,n} (v_{jk})^2}}.$$

18. The image processing system according to claim 1, wherein the noise reducing means includes averaging means which sets a vector signal obtained by subjecting the vector signal through the filtering process and the vector signal in the target region to the weighted averaging process using a predetermined weighting factor as the vector signal in the target region.

19. The image processing system according to claim 1, wherein the noise reducing means includes replacement means which sets the vector signal through the filtering process as the vector signal in the target region.

20. The image processing system according to claim 1, wherein the image pickup device is a single image pickup device in front of which is arranged an R (red), G (green), B (blue) Bayer-type primary color filter or a single image pickup device in front of which is arranged a Cy (cyan), Mg (magenta), Ye (yellow), G (green) color-difference line-sequential type complementary color filter.

21. The image processing system according to claim 1 further includes scalar means which obtains the plurality of color signals from the noise reduced vector signal by the noise reducing means.

22. An image processing method which executes noise reducing process with respect to an image signal formed of a plurality of color signals from an image pickup device comprising:
   an extraction step for extracting a local region including a target region to be subjected to a noise reduction process and at least one or more neighborhood regions which exist neighborhood of the target region from the image signal;
   a vectorizing step for obtaining vector signals which contain the plurality of color signals as components for each of the target and the neighborhood regions;
   a set step for setting weighting factors with respect to each of the vector signals in the local region based on the vector signal in the target region;
   a filtering step for filtering the vector signals in the local region using the weighting factors; and
   a noise reducing step for reducing a noise of the vector signal in the target region based on the vector signal through the filtering step.

23. The image processing method according to claim 22, wherein the set step includes:
   a norm calculating step for calculating a norm of each of the vector signals in the local region;
   a noise estimation step for estimating a noise amount of the vector signal in the target region based on the norm of the vector signal in the target region;
   a constant calculating step for calculating a constant term of a function for calculating a weighting factor based on the noise amount; and
   a weighting factor calculating step for calculating the weighting factor of each of the vector signals in the local region based on the norm of each of the vector signals in the local region and the function setting the constant term.

24. The image processing method according to claim 23, wherein the noise estimation step includes:
   a collection step for collecting information data with respect to a temperature value of the image pickup device and a gain value of the image signal;
   an assigning step for assigning a standard value with respect to the information data which are not supplied from the collection step; and
   a noise amount calculating step for calculating a noise amount with respect to the vector signal based on the information data supplied from the collection step or the assigning step, and the norm of the vector signal in the target region.

25. The image processing method according to claim 23, wherein the constant calculating step calculates a constant term with respect to a combination of a plurality of linear functions as the function or a constant term with respect to a second order function as the function.

26. The image processing method according to claim 23, wherein the weighting factor calculating step includes:
   an average measure value calculating step for calculating an average of the measure values between the vector signal in the target region and each of the vector signals in the neighborhood regions;

a deviation calculating step for calculating a deviation with respect to the vector signal in the target region based on the average of the measure values and the noise amount of the vector signal in the target region; and a target vector weighting factor calculating step for calculating the weighting factor of the vector signal in the target region based on the deviation.

27. The image processing method according to claim 22, wherein the filtering step includes:

a weighted measure value calculating step for calculating a total value obtained by multiplying the measure value between the vector signal and other vector signal by the weighting factor for each of the vector signals in the local region;

a search step for searching a minimum value from the total value of the measure value with respect to each of the vector signals in the local region; and an output step for outputting the vector signal corresponding to the total value of the minimum measure value.

28. The image processing method according to claim 22, wherein the noise reducing step includes an averaging step for setting the vector signal obtained by subjecting the vector signal through the filtering process and the vector signal in the target region to a weighted averaging process using the predetermined weighting factor as the vector signal in the target region.

29. The image processing method according to claim 22, wherein the noise reducing step includes a replacement step for setting the vector signal through the filtering process as the vector signal in the target region.

30. The image processing method according to claim 22 further includes a scalar step which obtains the plurality of color signals from the noise reduced vector signals by the noise reducing step.

31. An image processing system which performs noise reducing process with respect to an image signal formed of a plurality of color signals from an image pickup device, comprising:

an extraction unit for extracting a local region which contains a target region to be subjected to the noise reducing process, and at least one or more neighborhood regions which exist neighborhood of the target region from the image signal;

a vectorizing unit for obtaining vector signals which contain the plurality of color signals as components for each of the target and the neighborhood regions;

a set unit for setting weighting factors with respect to each of the vector signals in the local region based on the vector signal in the target region;

a filtering unit for performing a filtering process using the weighting factors with respect to the vector signals in the local region; and a noise reducing unit for reducing a noise of the vector signal in the target region based on the vector signal through the filtering process.

32. A non-transitory computer readable medium storing a image processing program which allows a computer to execute noise reducing process with respect to an image signal formed of a plurality of color signals from an image pickup device comprising:

a first module for extracting a local region including a target region to be subjected to a noise reduction process and at least one or more neighborhood regions which exist neighborhood of the target region from the image signal;

a second module for obtaining vector signals which contain the plurality of color signals as components for each of the target and the neighborhood regions;

a third module for setting weighting factors with respect to each of the vector signals in the local region based on the vector signal in the target region;

a fourth module for filtering the vector signals in the local region using the weighting factors; and a fifth module for reducing a noise of the vector signal in the target region based on the vector signal through the filtering process.

* * * * *